United States Patent
Nagakubo et al.

(10) Patent No.: US 7,165,874 B2
(45) Date of Patent: Jan. 23, 2007

(54) BACKLIGHT UNIT AND LIQUID CRYSTAL DISPLAY DEVICE

(75) Inventors: Hideaki Nagakubo, Fukushima-ken (JP); Takenobu Kimura, Fukushima-ken (JP)

(73) Assignee: Alps Electric Co., Ltd, Tokyo (JP)

(*) Notice: Subject to any disclaimer, the term of this patent is extended or adjusted under 35 U.S.C. 154(b) by 152 days.

(21) Appl. No.: 10/717,345

(22) Filed: Nov. 19, 2003

(65) Prior Publication Data
US 2004/0109105 A1    Jun. 10, 2004

(30) Foreign Application Priority Data
Nov. 29, 2002 (JP) .............................. 2002-347151

(51) Int. Cl.
    *F21V 7/04* (2006.01)
(52) U.S. Cl. .................. 362/623; 362/625; 362/626; 349/65
(58) Field of Classification Search ............... 362/603, 362/606, 607, 608, 609, 617, 620, 623, 626, 362/329, 330, 625; 349/65
See application file for complete search history.

(56) References Cited

U.S. PATENT DOCUMENTS

| | | | |
|---|---|---|---|
| 5,390,276 A * | 2/1995 | Tai et al. ............... | 385/146 |
| 5,626,800 A | 5/1997 | Williams et al. | |
| 5,926,601 A * | 7/1999 | Tai et al. ............... | 385/146 |
| 5,961,198 A * | 10/1999 | Hira et al. ............ | 362/621 |
| 6,347,873 B1 * | 2/2002 | Hosseini et al. ....... | 362/31 |
| 6,502,947 B2 * | 1/2003 | Matsumoto et al. .... | 362/31 |
| 6,705,739 B2 * | 3/2004 | Kuo ....................... | 362/26 |
| 6,729,737 B2 * | 5/2004 | Jeon et al. ............. | 362/31 |

FOREIGN PATENT DOCUMENTS

JP        2000-11728        1/2000

\* cited by examiner

*Primary Examiner*—Thomas M. Sember
(74) *Attorney, Agent, or Firm*—Brinks Hofer Gilson & Lione

(57) ABSTRACT

A backlight 10 includes a light source 13, a light guide plate 12 for introducing light emitted from the light source 13 from an incidence surface 12a provided on an end and for emitting the light from one surface, a diffusive reflector 15 provided such that the surface having a minute concavo-convex portion 15d faces the other surface of the light guide plate 12, and a light directivity control sheet 17 provided on the one surface of the light guide plate 12 such that the apexes 17c of pyramid-shaped objects 17b face the opposite side to the light guide plate 12.

20 Claims, 14 Drawing Sheets

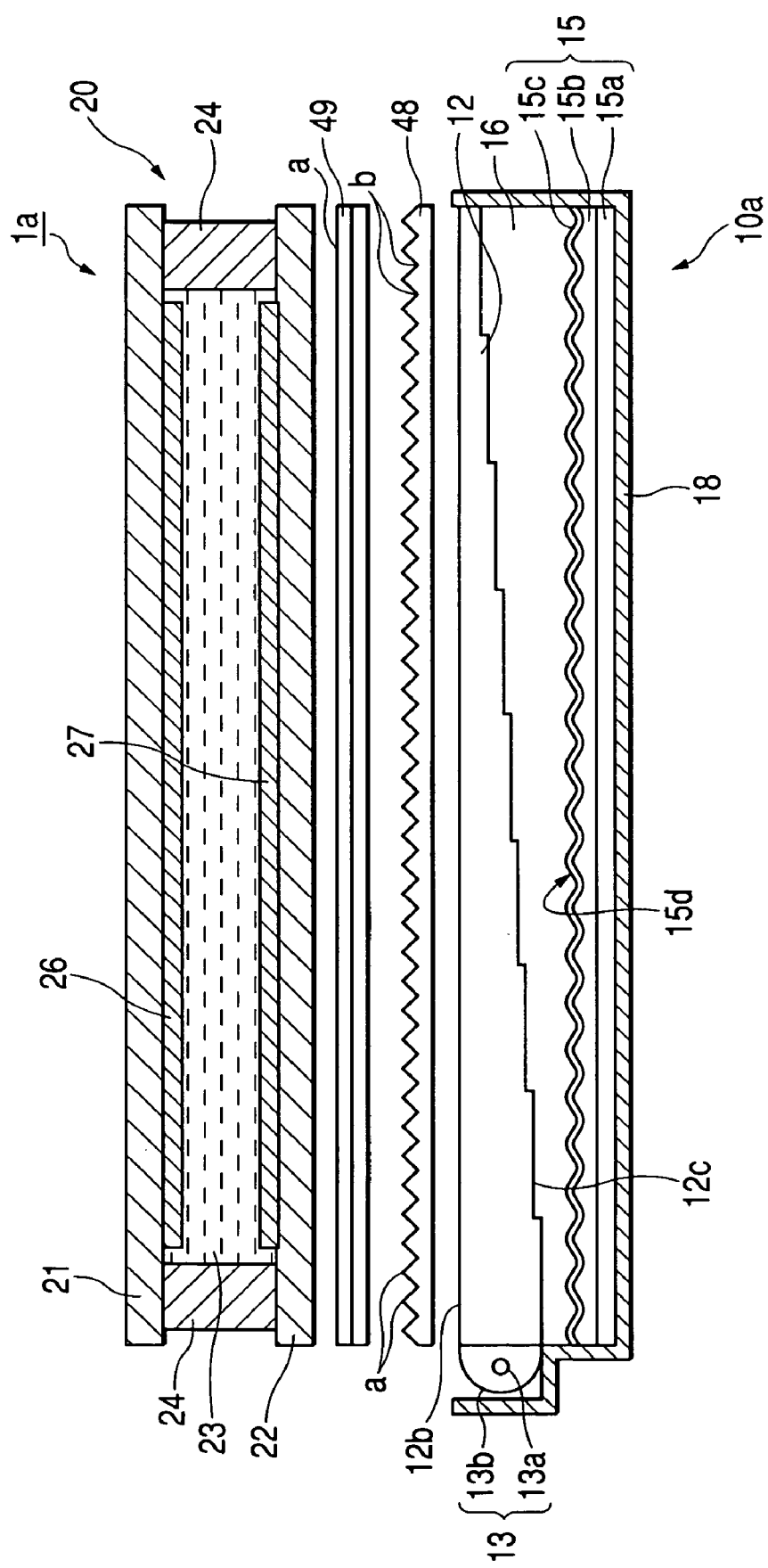

BACKLIGHT UNIT AND LIQUID CRYSTAL DISPLAY DEVICE

This application claims the benefit of priority to Japanese Patent Application No. 2002-347151, herein incorporated by reference.

BACKGROUND OF THE INVENTION

1. Field of the Invention

The present invention relates to a backlight unit most suitable for a backlight of a liquid crystal display device and a liquid crystal display device including the same.

2. Description of the Related Art

FIG. 21 is a schematic sectional view illustrating an example of a conventional passive (simple matrix type) liquid crystal display device. A liquid crystal display device 300 according to the example includes a transmissive or transflective liquid crystal display unit 320 and a backlight 310 arranged on the rear side of the liquid crystal display unit 320 (for example, refer to the Patent Documents 1 and 2.).

In the backlight 310, light emitted from a long light source 313 such as a cold cathode fluorescent lamp (CCFL) is incident on an incident surface (a side surface) 312a of a plate-shaped light guide plate 312 and emits from an emission surface (an upper surface) 312b of the light guide plate 312 that is opposite to the liquid crystal unit 320.

A reflection member 317 composed of a plurality of protrusions or dot-shaped plane patterns, which are white or reflective, is formed on a surface (a lower surface) 312c opposite to the emission surface 312b of the light guide plate 312, thereby providing light reflection property.

A diffuser sheet 314 is arranged on the emission surface 312b of the light guide plate 312, and two prism sheets 315 and 316 are sequentially disposed on the diffuser sheet 314, thereby providing the diffusivity of light and the uniformity of brightness distribution. Each of the prism sheets is obtained by forming a series of protrusions 318 being triangular shapes in section and a series of grooves 319 being wedge shapes in section on a layer formed on a substrate as illustrated in FIG. 22. In the two prism sheets 315 and 316, the direction, where the edge lines of the protrusions 318 of one prism sheet are extended, is at an angle of 90° with the direction, where the edge lines of the protrusions 318 of the other prism sheet are extended (that is, the structures of two prisms are orthogonal to each other). Therefore, a light component in a certain direction among the light components emitted from the emission surface 312b of the light guide plate 312 passes through the prism sheet 315, is collected at a viewing angle in a certain angle range (for example, 0° to 70°), and is emitted as emitted light L21. Furthermore, a light component in a different direction passes through the prism sheet 316 of the other side, is collected at a viewing angle in a certain angle range (for example, 0° to 70°), and is emitted as emitted light L22.

Recently, the use of a white light emitting diode (LED), which is a point light source, as a light source for a backlight is suggested.

[Patent Document 1]

Japanese Unexamined Patent Application Publication No. 11-500071

[Patent Document 2]

Japanese Unexamined Patent Application Publication No. 10-169922

However, the conventional backlight 310 has a poor utilization efficiency of light. For example, though light is emitted from the light source 313 to the light guide plate 312, some light components leak from the lower surface 312c of the light guide plate to the outside. Since the conventional backlight 310 has a large number of parts, the thickness thereof tends to increase, and in addition the price of the backlight 310 becomes expensive. Furthermore, according to the conventional art, a thin and low cost backlight obtained by improving the utilization efficiency of the light emitted from the light source, which is capable of uniformly and brightly illuminating the display region (an illuminated region) of the liquid crystal display unit 320, is not realized.

Moreover, since the conventional liquid crystal display device 300 includes the above-mentioned backlight 310, the liquid crystal display device 300 has a larger thickness, costs much, and has large power consumption.

SUMMARY OF THE INVENTION

Accordingly, embodiments of the present invention provide a backlight unit capable of improving the utilization efficiency of light.

Embodiments of the present invention also provide a thin and low cost backlight unit obtained by improving the utilization efficiency of light, which is capable of uniformly and brightly illuminating an illuminated region.

Furthermore, embodiments of the present invention also provide a liquid crystal display device including the backlight unit and that is capable of being driven by low power consumption.

Moreover, embodiments of the present invention also provide a thin and low cost liquid crystal display device including the backlight unit, having high brightness, having excellent display quality, and driven by low power consumption.

Furthermore, it is another object of the present

A backlight unit according to the present invention comprises a light source; a light guide plate for introducing light emitted from the light source from an incidence surface provided on an end and for emitting the light from one surface; and a diffusive reflector provided on the other surface of the light guide plate, wherein the diffusive reflector is provided such that a minute concavo-convex portion having a light reflection property is formed on the surface of a base thereof and that the surface having the minute concavo-convex portion faces the other surface of the light guide plate.

In the above-mentioned backlight unit, though the light emitted from the light source to the light guide plate is emitted from the other side of the light guide plate to the outside, the emitted light is reflected by the minute concavo-convex portion of the diffusive reflector and is incident on the light guide plate again. Therefore, it is possible to reduce the loss of light and to efficiently use the light emitted from the light source to the light guide plate as illumination light.

Furthermore, the light emitted from one surface (the emission surface) of the light guide plate includes the light, which is emitted from the light source, propagates through the light guide plate, and is emitted from the emission surface, and the light, which is emitted from the light source, propagates through the light guide plate, is emitted from the other side of the light guide plate, reaches the diffusive reflector, is reflected by the minute concave-convex portion of the diffusive reflector, and is emitted from the emission surface through the light guide plate again. Therefore, the emission efficiency of the backlight unit improves. In addition, since light is diffused by the minute concavo-convex portion of the diffusive reflector, the uniformity of the emitted light improves.

Therefore, according to the backlight unit of the present invention, it is possible to improve the utilization efficiency of light and the uniformity of the emitted light and to brightly illuminate the illuminated region.

In the backlight unit having the above structure according to the present invention, a light directivity control sheet, in which a plurality of pyramid-shaped objects is formed on a base, is provided on one surface of the light guide plate such that the apexes of the pyramid-shaped objects faces the opposite side to the light guide plate, and the light directivity control sheet controls the directivity of transmissive light components of at least two other directions of the light components that are emitted from the one surface of the light guide plate and pass through the light directivity control sheet.

The backlight unit having theabove-mentioned structure includes the light directivity control sheet having the above-mentioned structure, thereby controlling the directivityof the transmitted light components having at least two other directions among the light components emitted from the emission surface of the light guide plate. Therefore, it is possible to condense light at an angle suitable for illuminating the object to be illuminated and to emit the light to the object to be illuminated. Furthermore, it is possible to uniformly and brightly illuminate the illuminated region since the amount of light that does not contribute to illuminating the object to be illuminated (useless light) is small. In addition, the backlight unit can control the directivity of the transmitted light components having at least two other directions among the light components emitted from the emission surface of the light guide plate by one light directivity control sheet. Therefore, it is possible to reduce the number of parts as compared with the conventional backlight, in which two prism sheets are provided. As a result, it is possible to make the backlight unit simple and thin and to lower the cost of the backlight unit.

In the backlight unit according to the present invention, a light diffusive sheet is provided on the surface of the light directivity control sheet where a plurality of pyramid-shaped objects is formed.

According to the backlight unit having the above structure, the light emitted from the emission surface of the light guide plate is further diffused by the light diffusive sheet. Therefore, it is possible to improve the uniformity of the emitted light.

Furthermore, in the backlight unit according to the present invention, a minute concavo-convex portion having light diffusion property is formed on a surface of the light directivity control sheet opposite to the light guide plate.

According to the backlight unit having the above structure, the light emitted from the emission surface of the light guide plate is diffused by the minute concavo-convex portion provided on the surface of the light directivity control sheet opposite to the light guide plate. Therefore, it is possible to further improve the uniformity of the emitted light. Furthermore, it is possible to reduce the number of parts as compared with the conventional backlight unit, in which the light diffusive sheet is separately provided. Therefore, it is possible to make the backlight unit thin.

In the backlight unit of the present invention having one of the above structures, since the thickness of the side far from the light source in the light guide plate is smaller than the thickness of the side close to the light source, it is possible to increase the amount and the uniformity of the light emitted from the emission surface of the light guide plate.

Furthermore, according to the backlight unit of the present invention having one of the above structures, the point light source including a long light source such as a cold cathode fluorescent lamp (CCFL), a dispersed electroluminescence (EL) device, and a light emitting diode (LED) may be used as the light source.

In the backlight unit of the present invention having one of the above structures, the light source comprises an intermediate light guide object provided along the end of the light guide plate and a point light source provided along the longitudinal end of the intermediate-light guide object.

Furthermore, a liquid crystal display device of the present invention comprises the backlight unit of the present invention having one of the above structures and a liquid crystal display unit illuminated by the backlight unit from the rear side.

In the liquid crystal display device according to the present invention, since the backlight unit according to the present invention, where the diffusive reflector is provided on the other surface of the light guide plate, is provided on the rear side of the liquid crystal display unit, it is possible to uniformly and brightly illuminate the display region (the illuminated region). Therefore, in the liquid crystal display device according to the present invention, displayed images are easily recognizable, and the quality of display is excellent. In addition, the liquid crystal display device can be driven by low power consumption due to the improvement of the utilization efficiency of light.

In the liquid crystal display device according to the present invention, the backlight unit according to the present invention, where the diffusive reflector is provided on the other surface of the light guide plate and the light directivity control sheet is provided on one surface (the emission surface), is provided on the rear side of the liquid crystal display unit. Therefore, it is possible to uniformly and brightly illuminate the display region (the illuminated region). As a result, in the liquid crystal display device according to the present invention, display is easily recognizable, and the quality of display is excellent. Furthermore, the liquid crystal display device can be driven by low power consumption due to the improvement of the utilization efficiency of light. Moreover, since the number of parts may be small, it is possible to make the liquid crystal display device thin and to lower the cost.

BRIEF DESCRIPTION OF THE DRAWINGS

FIG. 10 is a sectional view illustrating a liquid crystal display device according to a second embodiment of the present invention;

DESCRIPTION OF THE PREFERRED EMBODIMENTS

Embodiments of the present invention will now be described with reference to the accompanying drawings. However, the present invention is not limited to the following embodiments.

(First Embodiment)

Figure 1:
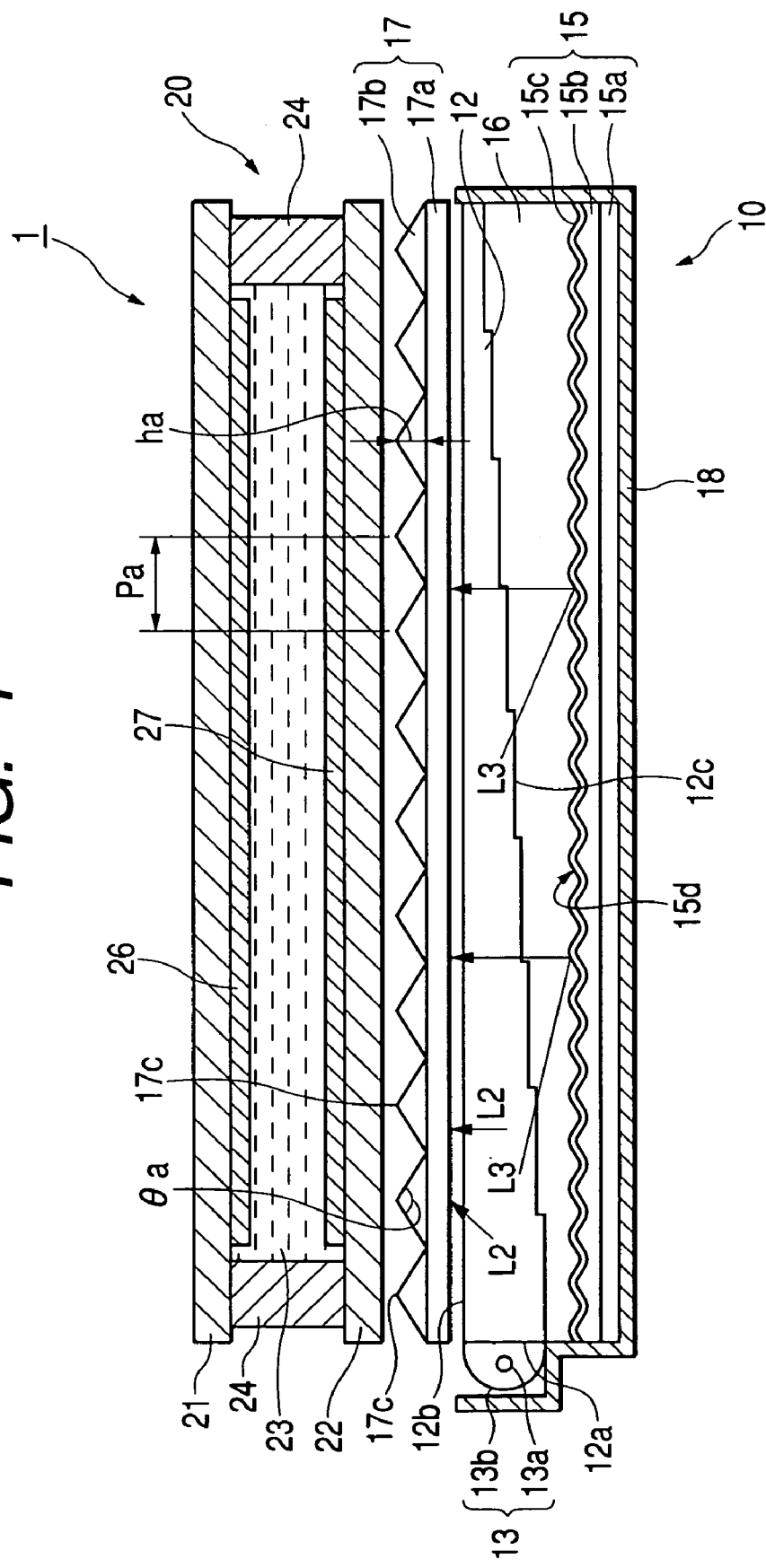
FIG. 1 is a sectional view illustrating a liquid crystal display device according to a first embodiment of the present invention.

FIG. 1 is a sectional view of a liquid crystal display device including a backlight (a backlight unit) according to a first embodiment of the present invention.

A liquid crystal display device 1 according to the present embodiment includes a liquid crystal display unit 20 and a backlight 10, which is arranged on the rear side of (below) the liquid crystal display unit 20 and illuminates the liquid crystal display unit 20 from the rear side.

The liquid crystal display unit 20 is transmissive. A first substrate 21 and a second substrate 22, which are made of glass and face each other with a liquid crystal layer 23 interposed therebetween, are bonded as one body by a sealing material 24. Display circuits 26 and 27 are formed on the side of the liquid crystal layer 23 of the first substrate 21 and on the side of the liquid crystal layer 23 of the second substrate 22, respectively.

The display circuits 26 and 27 include an electrode layer, which is composed of a transparent conductive film and drives the liquid crystal layer 23, or an alignment film for controlling the alignment of the liquid crystal layer 23 (wherein, the electrode layer and the alignment film are not shown). Furthermore, if necessary, the display circuits 26 and 27 may include color filters for display color images.

The backlight 10 includes a transparent light guide plate 12, a light source 13, a diffusive reflector 15, a light directivity control sheet 17, and a sustaining member 18. In the backlight 10, the light source 13 is disposed at the end 12a through which light is introduced to the light guide plate 12. The diffusive reflector 15 is disposed to face a surface (a lower surface or the other surface) opposite to the emission surface (the upper surface or one surface) 12b of the light guide plate 12 with an air space 16. The light directivity control sheet 17 is arranged on the emission surface 12b of the light guide plate 12.

The light guide plate 12 is arranged on the rear side of (below) the display region of the liquid crystal display unit 20, and the light emitted from the light source 13 is irradiated to the liquid crystal display unit 20 through the light guide plate 12. The light guide plate 12 is made of flat plate-shaped transparent acryl resin. As illustrated in FIG. 1, the light source 13 is disposed on one end 12a (hereinafter, an incidence surface 12a in some cases) of the light guide plate 12. The light emitted from the light source 13 is introduced to the inside of the light guide plate 12 through the incidence surface 12a. The upper surface (the surface on the side of the liquid crystal display unit 20) of the light guide plate 12 is the emission surface 12b.

Transparent resin materials, such as polycarbonate-based resin and epoxy resin other than acryl-based resin, or glass may be used as materials that constitute the light guide plate 12. To be specific, though not specifically limited, Arton (the name of a product manufactured by JSR Corporation) or Zeonor (the name of a product manufactured by Zeon Corporation) is most appropriate.

The emission surface 12b of the light guide plate 12 is arranged to face the liquid crystal display unit 20, and the light for illuminating the liquid crystal display unit 20 is emitted through the emission surface 12b.

A step is formed on the surface 12c opposite to the emission surface 12b of the light guide plate 12. The thickness of the step is gradually reduced as it becomes more distant from the light source 13. That is, the thickness of the side far from the light source 13 is smaller than the thickness of the side close to the light source 13. As a result, it is possible to obtain the above-mentioned effect.

The light source 13 includes a long cold cathode fluorescent lamp 13a and a reflector sheet 13b disposed around the cold cathode fluorescent lamp 13a. The reflector sheet 13b reflects the light emitted from the cold cathode fluorescent lamp 13a toward the incidence surface of the light guide plate 12 and effectively makes the light from the cold cathode fluorescent lamp 13a incident on the inside of the light guide plate 12.

An adhesion layer may be used instead of the air space 16. In this case, the adhesion layer is made of a bonding material having a property of transmitting light. It is better when the distance between the refractive index of the adhesion layer and the refractive index of the light guide plate 12 is larger.

Figure 2:
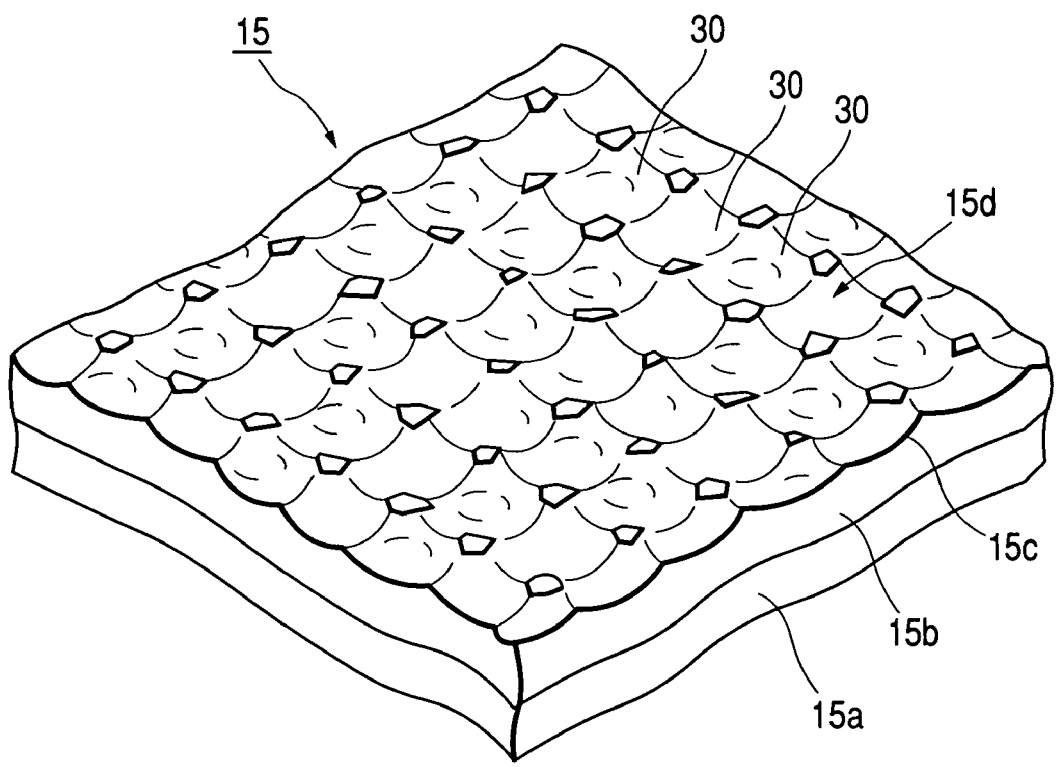
FIG. 2 is a perspective view illustrating an enlargement of a diffusive reflector of a backlight included in the liquid crystal display device according to the first embodiment.

FIG. 2 is a perspective view illustrating the enlargement of a part of the diffusive reflector (the diffusive reflector according to a first example) 15.

In the diffusive reflector 15, a minute concavo-convex portion 15d having the light reflection property is disposed on the surface of a base. The minute concavo-convex portion 15d has a plurality of concave portions 30.

In the present embodiment, the base includes a substrate 15a, an organic film 15b made of the acryl-based resin, which is disposed on the substrate 15a, and a reflector sheet 15c composed of a metal film having high reflectivity, which is disposed on the surface of the organic film 15b.

The organic film 15b can be obtained by forming a plane-shaped resin layer made of photosensitive resin on the substrate 15a composed of, for example, a polyethylene terephthalate (PET) film, pressing a transfer mold made of the acryl-basedresin, whose surface has a concavo-convex portion reverse to the concavo-convex portion on the surface of the desired organic film 15b, to the surface of the resin layer, and hardening the resin layer. As a result, the reflector sheet 15c is formed on the organic film 15b, on which the concave portion is formed. The reflector sheet 15c may be made of a metal material having high reflectivity such as Al or Ag by a sputtering method or a vacuum evaporation coating method.

The substrate 15a may be removed after forming the reflection film 15c. In this case, the base of the diffusive reflector 15 is formed of the organic film 15b and the reflector sheet 15c.

The diffusive reflector 15 is disposed such that a surface (a minute concavo-convex portion formation surface), where the minute concavo-convex portion 15d is formed, faces the lower surface 12c of the light guide plate 12.

The reflection property of the diffusive reflector 15 can be controlled by changing the inside shapes of the plurality of concave portions 30 formed on the surface of the reflector sheet 15c.

According to the present embodiment, it is preferable that the depths of the concave portions 30 are randomly formed in the range of 0.1 μm to 3 μm and the pitches between the adjacent concave portions 30 are randomly set in the range of 5 μm to 100 μm. Furthermore, it is preferable that the tilt angles inside the concave portions are set in the range of −18° to +18°.

Figure 3:
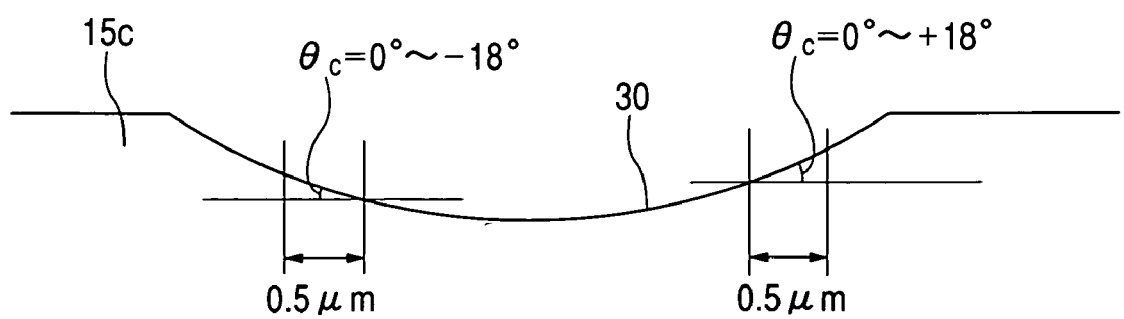
FIG. 3 is a sectional view illustrating a concave portion in the diffusive reflector shown in FIG. 2.

In the present specification, the depth of the concave portion is the distance between a portion, where the concave portion is not formed, and the bottom of the concave portion in the surface (the base surface) of the reflector sheet 15c. The pitch between the adjacent concave portions is the distance between the centers of the concave portions that are circular in plan view. In addition, as illustrated in FIG. 3, when a minute range having the width of, for example, 0.5 μm is obtained in an arbitrary portion inside the concave portion 30, the tilt angle inside the concave portion is a tilt angle θc with respect to the horizontal plane (the base surface) within the minute range. For example, in FIG. 3, the angle θc is defined such that the right tilted surface is positive and the left tilted surface is negative with respect to a normal line to the portion, where the concave portion is not formed, in the surface (the base surface) of the reflector sheet 15c.

According to the present embodiment, the distribution of the tilt angles inside the concave portions 30 are set in the range of −18° to +18° and are randomly arranged the pitches between the adjacent concave portions 30 with respect to all of the directions of a plane. Such distribution and arrangement is because, when the pitches between the adjacent concave portions 30 have regularity, colored reflection light is generated by optical interference. When the distribution of the tilt angles inside the concave portions 30 exceeds the range of −18° to +18°, the diffusion angle of the reflection light becomes too large. Therefore, the reflection intensity deteriorates, and images cannot be displayed with high brightness (The diffusion angle of the reflected light is 55° or more in the air.)

Furthermore, when the depth of the concave portion 30 is less than 0.1 μm, large enough light diffusion effect cannot be obtained by forming the concave portion in the reflection surface. When the depth of the concave portion 30 is larger than 3 μm, the pitch must be made large in order to obtain an enough light diffusion effect, which may cause moiré-fringes.

When the pitch between the adjacent concave portions 30 is less than 5 μm, the manufacture the transfer mold used for forming the organic film 15b is restricted, and processing time is extremely long. Furthermore, it is impossible to form a shape that enables a desired reflection property to be obtained, and the interference light is generated. The transfer mold for forming the shape of the surface of the organic film 15b is manufactured by transferring the shape of the surface of a mother die for the transfer mold, which is manufactured by pressing a diamond indenter to a base such as stainless steel many times, into silicon resin. The diameter of the front end of the diamond indenter is preferably 30 μm to 200 μm for practical use. Therefore, the pitches between the adjacent concave portions 30 are preferably 5 μm to 100 μm.

Figure 4:
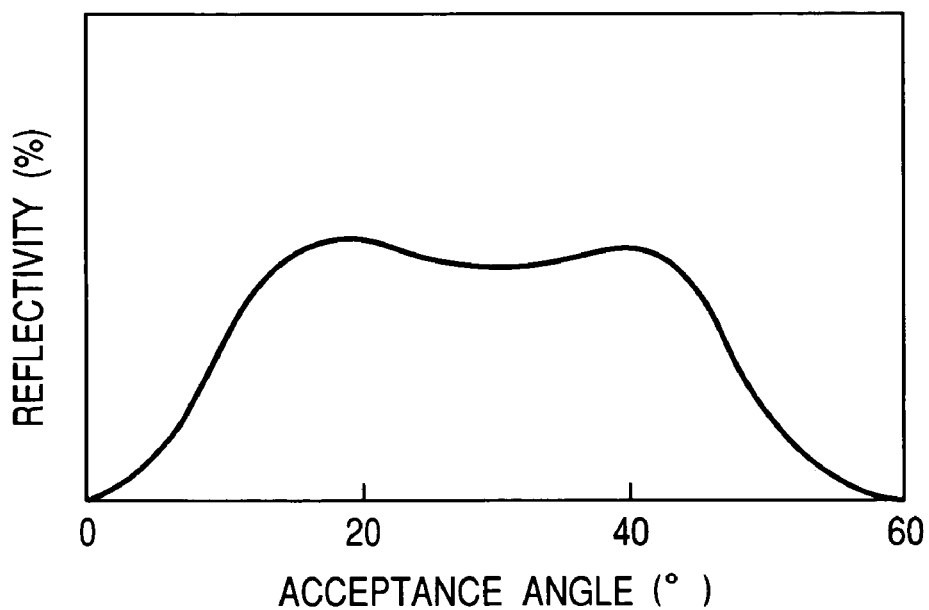
FIG. 4 is a graph illustrating an example of the reflection property of the diffusive reflector including the concave portion illustrated in FIG. 3.

FIG. 4 illustrates a relationship between an acceptance angle (unit: °) and brightness (reflectivity, unit: %) when light is radiated at an incidence angle 30° into the reflection surface (the base surface) of the diffusive reflector 15 used for the present embodiment and the acceptance angle is changed from the perpendicular line position (0°: the normal line direction) to 60° with an angle 30°, which is the specular reflection direction with respect to the reflection surface (the base surface), as the center. As illustrated in FIG. 4, it is possible to obtain almost uniform reflectivity in a large acceptance angle range on the basis of the specular reflection direction.

Such possibility is because the depth or the pitch of the concave portion 30 illustrated in FIG. 3 is controlled to the above-mentioned range and because the inside of the concave portion 30 forms a spherical surface. That is, the tilt angle inside the concave portion 30, which controls the reflection angle of light, is controlled to a uniform range because the depth and the pitch of the concave portion 30 are formed in limitation. Therefore, it is possible to control the reflection efficiency of the reflector sheet 15c to a uniform range. Furthermore, it is possible to obtain uniform reflectivity in the large reflection direction of the reflector sheet 15c because the inside of the concave portion 30 is a spherical surface symmetrical with respect to all of the directions.

Figure 5:
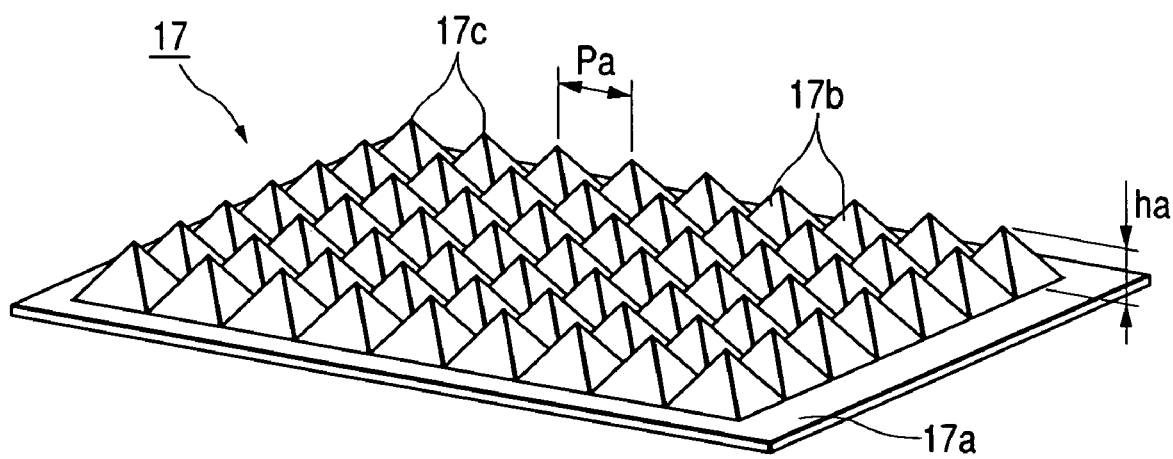
FIG. 5 is a perspective view illustrating an enlargement of a light directivity control sheet of the backlight included in the liquid crystal display device according to the first embodiment.

FIG. 5 is a perspective view illustrating the enlargement of a part of the light directivity control sheet 17.

The light directivity control sheet 17 controls the directivity of the transmitted light components having at least two other directions among the light components that are emitted from the emission surface 12b of the light guide plate 12 and pass through the light directivity control sheet 17. The light directivity control sheet 17 is obtained by forming a plurality of quadrangular pyramids (pyramid-shaped objects) 17b made of materials, such as acryl-based resin, epoxy-based resin, and polycarbonate-based resin, on the base 17a composed of a polyester film, a polycarbonate (PC) film, and a polyethylene terephthalate (PET) film. In the light directivity control sheet 17b, the apexes 17c of the quadrangular pyramids 17b face the opposite side to the light guide plate 12 (face the liquid crystal display unit 20).

The thickness of the light directivity control sheet 17 is in the range of 50 μm to 200 μm.

The angle θa of each of the apexes of the quadrangular pyramids 17b is in the range of 70° to 110°, preferably, in the range of 80° to 100°.

The height ha of the quadrangular pyramids 17b is in the range of 10 μm to 80 μm, preferably, in the range of 30 μm to 60 μm.

The pitch Pa between adjacent apexes 17c is in the range of 30 μm to 100 μm, preferably, in the range of 40 μm to 80 μm.

The plurality of quadrangular pyramids 17b formed on the base 17a is preferably arranged in accordance with the distance from the light source 13 (in accordance with the distribution of light from the light source 13). For example, the pitch Pa and/or the height ha of the quadrangular pyramid 17b are/is changed in accordance with the distance from the light source 13a. To be more specific, the pitch Pa between the quadrangular pyramids 17b may be smaller (denser) in the portion far from the light source 13 than in the portion closer to the light source 13. The height ha of the quadrangular pyramid 17b may be larger in the portion far from the light source 13 than in the portion closer to the light source 13.

A sustaining member 18 is disposed to surround the light guide plate 12, the light source 13, and the diffusive reflector 15 and to collectively accommodate them, thereby integrally sustaining the light guide plate 12, the light source 13, and the diffusive reflector 15. In addition, it is possible to re-utilize leakage light generated by various members by letting the inside of the sustaining member 18 have the light reflection property.

It is possible to perform transmissive liquid crystal display by turning on the backlight 10 disposed on the rear side of the liquid crystal display unit 20 in a liquid crystal display device 1 according to the present embodiment.

To be specific, the light, which is emitted from the light source 13 in the backlight 10 and introduced to the light guide plate 12 through the incidence surface 12a of the light guide plate 12, is reflected from the inside of the light guide plate 12 and propagates through the inside of the light guide plate 12. A part of the light L2, which propagates through the light guide plate 12, is emitted from the emission surface 12b. The other part of the light L3, which propagates through the inside of the light guide plate 12, is emitted from the lower surface 12c of the light guide plate 12 and is reflected from the diffusive reflector 15 capable of controlling the reflection property. The reflected light L3 passes through the light guide plate 12 and is emitted from the emission surface 12b of the light guide plate 12. The light components L2 and L3 emitted from the emission surface 12b of the light guide plate 12 pass through the light directivity control sheet. 17, thereby having the directivity thereof controlled, and are collected at an angle suitable for illuminating the liquid crystal display unit 20 (an illuminated region), thereby illuminating the liquid crystal display unit 20 (in particular, a display region) from the rear side thereof.

The images displayed on the liquid crystal display unit 20 are recognized by a user as the liquid crystal display unit is illuminated from the rear side.

In the backlight 10 according to the present embodiment, though the light emitted from the light source 13 to the light guide plate 12 is emitted from below the light guide plate 12, the emitted light is reflected from the minute concavo-convex portion 15d of the diffusive reflector 15, and the reflected light is incident on the light guide plate 12 again. Therefore, it is possible to reduce the loss of light and to effectively use the light emitted from the light source 13 to the light guide plate 12 as illumination light. In addition, the light emitted from the emission surface 12b of the light guide plate 12 includes the light component L3, which is reflected from the minute concavo-convex portion 15d of the diffusive reflector 15, passes through the light guide plate, and is emitted from the emission surface 12b again, and the light component L2, which is emitted from the light source 13, propagates through the light guide plate, and is emitted from the emission surface 12b. Therefore, the emission efficiency of the backlight 10 improves. Furthermore, since light is diffused by the minute concavo-convex portion 15d of the diffusive reflector 15, the uniformity of the emitted light improves.

In addition, since the light directivity control sheet 17 having the above structure is provided, it is possible to reduce the number of parts as compared with the conventional backlight in which two prism sheets are provided. Therefore, it is possible to make the backlight simple and thin and to lower the cost of the backlight. For example, the backlight 10 having the thickness of 1.1 mm or less can be formed, which is preferable in making the liquid crystal display device 1 thin.

Thus, according to the backlight 10 of the present embodiment, it is possible to uniformly and brightly illuminate the region to be illuminated and to improve the utilization efficiency of light. As a result, it is possible to realize a thin and low cost backlight.

Furthermore, since the liquid crystal display device 1 according to the present embodiment, which includes the above-mentioned backlight 10 provided on the rear side of the liquid crystal display unit, can uniformly and brightly illuminate the liquid crystal display unit 20, displayed images are easily recognizable, and the quality of display is excellent. In addition, the liquid crystal display device can be driven by low power consumption due to the improvement of the utilization efficiency of light. Also, since the number of parts may be less, it is possible to realize a thin and low cost liquid crystal display device.

According to the liquid crystal display device 1 of the present embodiment, when ambient light such as sun light or illumination is bright enough, the ambient light is reflected by the diffusive reflector 15 of the backlight 10 without turning on the backlight 10. Thus, it is possible to perform reflective or transflective liquid crystal display using the reflected light.

To be specific, the ambient light of the liquid crystal display device 1 reaches the diffusive reflector 15 through the liquid crystal display unit 20 and the light guide plate 12 of the backlight 10. The liquid crystal display unit is illuminated by the light reflected from the surface of the reflector sheet 15c from the rear side. Then, the images displayed by the liquid crystal display unit 20 are recognized by the user.

Since the reflection surface of the diffusive reflector 15 is shaped as mentioned above, it is possible to prevent undesirable reflection from the reflection surface. Furthermore, since the range of the reflection angle in the diffusive reflector 15 is large, the uniformity is excellent. Therefore, it is possible to obtain a liquid crystal display device having a wide viewing angle and a bright display screen.

Figure 6:
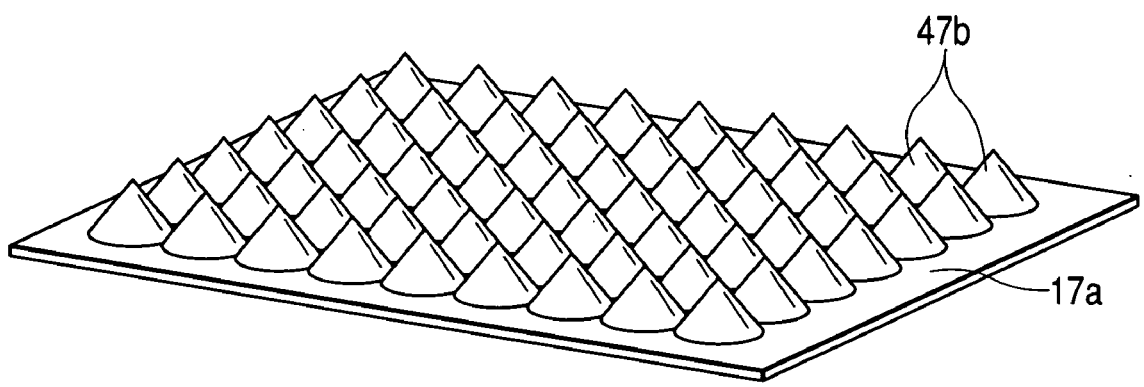
FIG. 6 is a perspective view illustrating an enlargement of a part of a light directivity control sheet according to another example, which is included in the backlight according to the present invention.

According to the above embodiment, the pyramid-shaped object, which is formed on the base 17a of the light directivity control sheet 17 included in the backlight 10, is the quadrangular pyramid 17b. However, the pyramid-shaped object is not limited to the quadrangular pyramid but may be a poly-pyramid such as a hexangular pyramid or an octangular pyramid, a cone 47b as illustrated in FIG. 6, or an elliptic cone.

Figure 7:
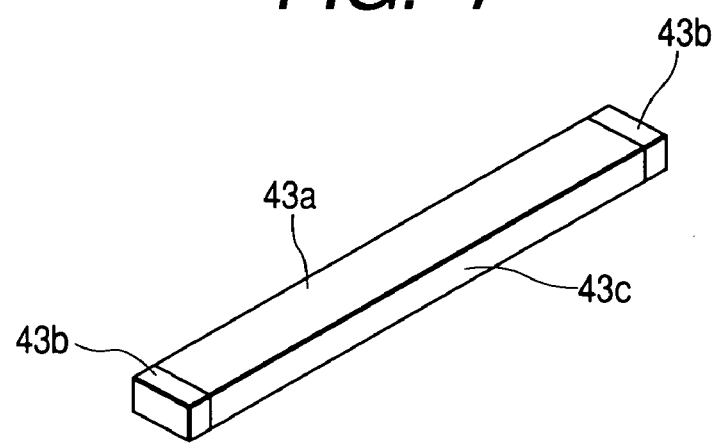
FIG. 7 is a perspective view illustrating a light source according to another example, which is included in the backlight according to the present invention.

According to the above embodiment, the light source 13 included in the backlight 10 includes the cold cathode fluorescent lamp 13a and the reflection plate 13b. However, a point light source, such as a dispersive electroluminescence (EL) device or a light emitting diode (LED), may be used as a light source. Alternatively, as illustrated in FIG. 7, the light source may be constituted of a square pillar-shaped intermediate light guider 43a, which is made of acryl-based resin or polycarbonate-based resin, and LED light-emitting elements 43b provided on both longitudinal ends of the intermediate light guider 43a. Anything that can uniformly radiate light to the incidence surface 12a of the light guide plate 12 may be appropriately used as a light source.

One side surface 43c of the intermediate light guider 43a shown in FIG. 7 is provided along the incidence surface 12a of the light guide plate 12. Furthermore, a prism surface is formed on a surface opposite to the one side surface 43c. The light introduced from the light-emitting elements 43b into the intermediate light guider 43a is reflected from the prism surface, and the traveling direction of the reflected light is changed toward the light guide plate 12. Then, the light from the light-emitting elements 43b is effectively radiated to the incidence surface 12a of the light guide plate 12.

Figure 8:
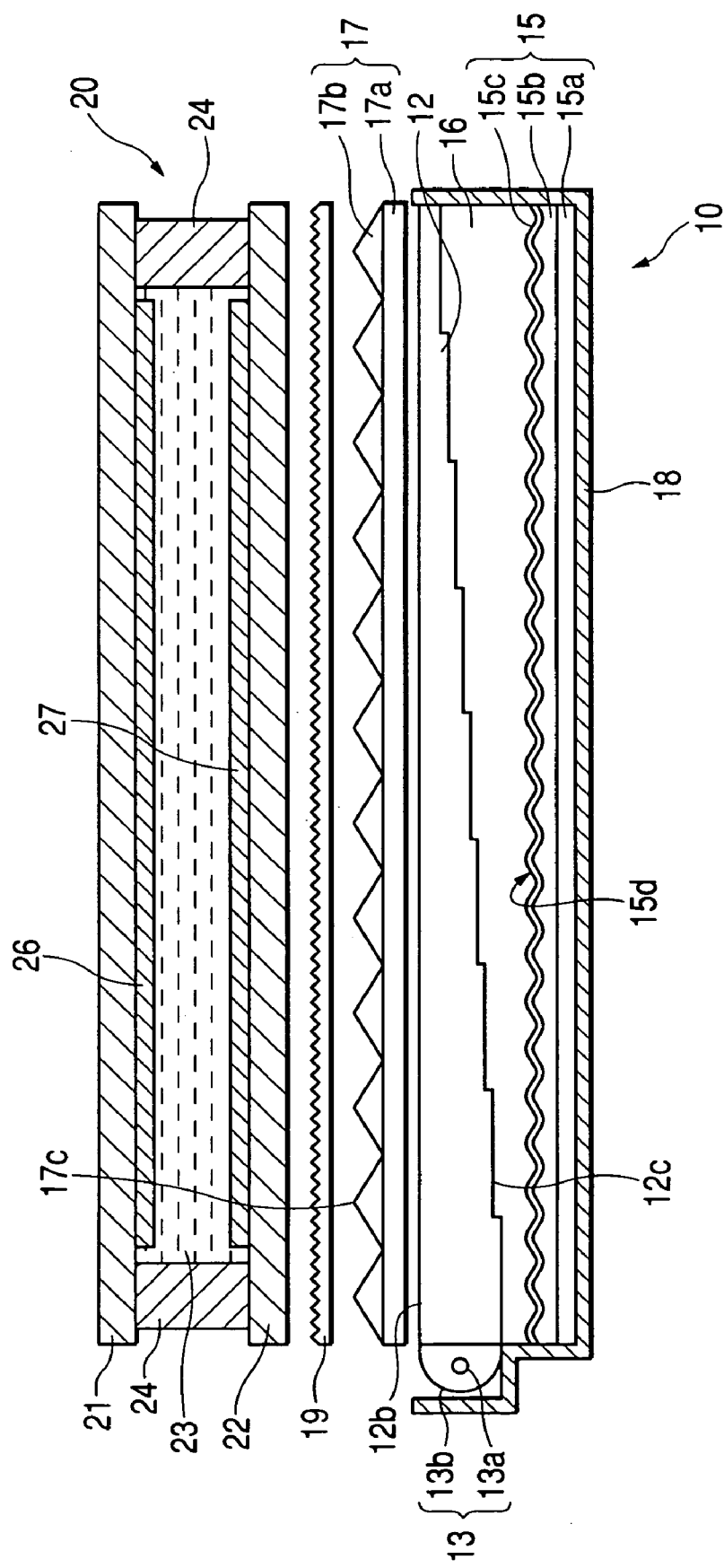
FIG. 8 is a sectional view illustrating another example of the liquid crystal display device according to the present invention.

In the backlight 10 according to the above embodiment, since the diffusive reflector 15 has light diffusion property, it is not necessary to provide a diffuser sheet of the conventional backlight. However, as illustrated in FIG. 8, a light diffusive sheet 19 may be provided on the surface of the light directivity control sheet 17, on which the plurality of quadrangular pyramids 17b is formed. Alternatively, as illustrated in FIG. 9, a minute concavo-convex portion 17g having the light diffusion property may be formed on the lower surface (the surface on the side of the light guide plate) of the light directivity control sheet 17.

The light diffusive sheet 19 of FIG. 8 is made of polyethylene terephthalate (PET) and polycarbonate (PC), and the concavo-convex portion is formed on the surface of the light diffusive sheet 19. When the light diffusive sheet 19 is provided, the light emitted from the emission surface 12b of the light guide plate 12 is diffused by the light diffusive sheet 19. Therefore, it is possible to further improve the uniformity of the emission light.

Figure 9:
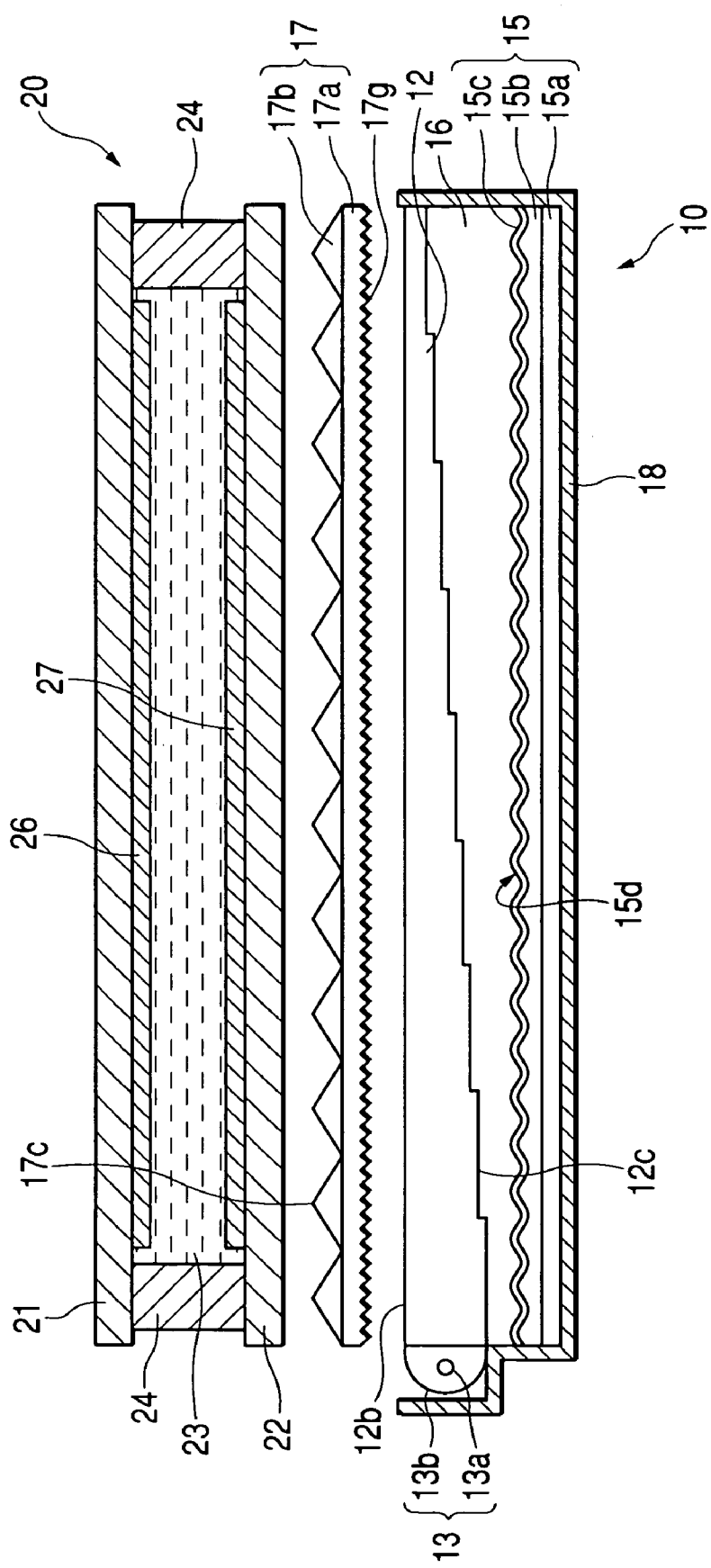
FIG. 9 is a sectional view illustrating another example of the liquid crystal display device according to the present invention.

The minute concavo-convex portion 17g illustrated in FIG. 9 can be obtained by performing a sandblast or embossing process on the lower surface of the base 17a of the light directivity control sheet 17. When the minute concavo-convex portion 17g having the light diffusion property is formed on the lower surface of the base 17a of the light directivity control sheet 17, it is possible to reduce the number of parts as compared with a case where the light diffusive sheet is separately provided. Therefore, it is possible to make the light diffusive sheet thin.

(Second Embodiment)

A liquid crystal display device according to a second embodiment of the present invention will now be described with reference to FIG. 10. FIG. 10 is a sectional view illustrating the liquid crystal display device according to the second embodiment.

A liquid crystal display device 1a according to the second embodiment is different from the liquid crystal display device 1 according to the first embodiment in the structure of the backlight. That is, in a backlight 10a according to the present embodiment, two prism sheets 48 and 49 are provided on the side of the emission surface 12b of the light guide plate 12. The structure of the backlight 10a is the same as that of the backlight 10 according to the first embodiment excluding the above. Therefore, detailed description thereof will be omitted. Furthermore, the basic structure of the liquid crystal display unit 20 is the same as that of the liquid crystal display unit illustrated in FIG. 1. Therefore, detailed description thereof will be omitted.

Each of the prism sheets is obtained by forming a series of protrusions a being triangular shapes in section and a series of grooves b being wedge shapes in section on a layer formed on a substrate as shown in FIG. 10. In the two prism sheets 48 and 49, the direction, to which the edge line of the protrusion a of one prism sheet is extended, is arranged at an angle of 90° with the direction, to which the edge line of the protrusion a of the other prism sheet is extended (that is, prism structures are orthogonal to each other). Therefore, a light component in a certain direction among the light components emitted from the emission surface 12b of the light guide plate 12 passes through the prism sheet 48, is collected at a viewing angle in a certain angle range, and is emitted as emission light. Furthermore, a light component in the other direction passes through the prism sheet 49, is collected at a viewing angle in a certain angle range, and is emitted as emission light.

In the backlight 10a according to the present embodiment, since the diffusive reflector 15 is also provided on the side of the lower surface of the light guide plate 12, it is possible to improve the utilization efficiency of the light emitted from the light source 13 to the light guide plate 12, to improve the uniformity of the emitted light, and to brightly illuminate the illuminated region.

In addition, in the liquid crystal display device 1a according to the present embodiment, since the backlight 10a according to the present embodiment is provided on the rear side of the liquid crystal display unit 20, it is possible to uniformly and brightly illuminate the liquid crystal display unit 20. Therefore, displayed images are easily recognizable, and the quality of display is excellent. Furthermore, the liquid crystal display device can be driven by low power consumption due to the improvement of the utilization efficiency of light.

(Second Example of Diffusive Reflector)

A second example of the diffusive reflector included in the backlight according to any one of the above embodiments will now be described.

The diffusive reflector according to the second example is very different from the diffusive reflector 15 according to the first embodiment in the shape of the inside of the concave portion of the minute concavo-convex portion formed in the diffusive reflector.

Figure 11A:
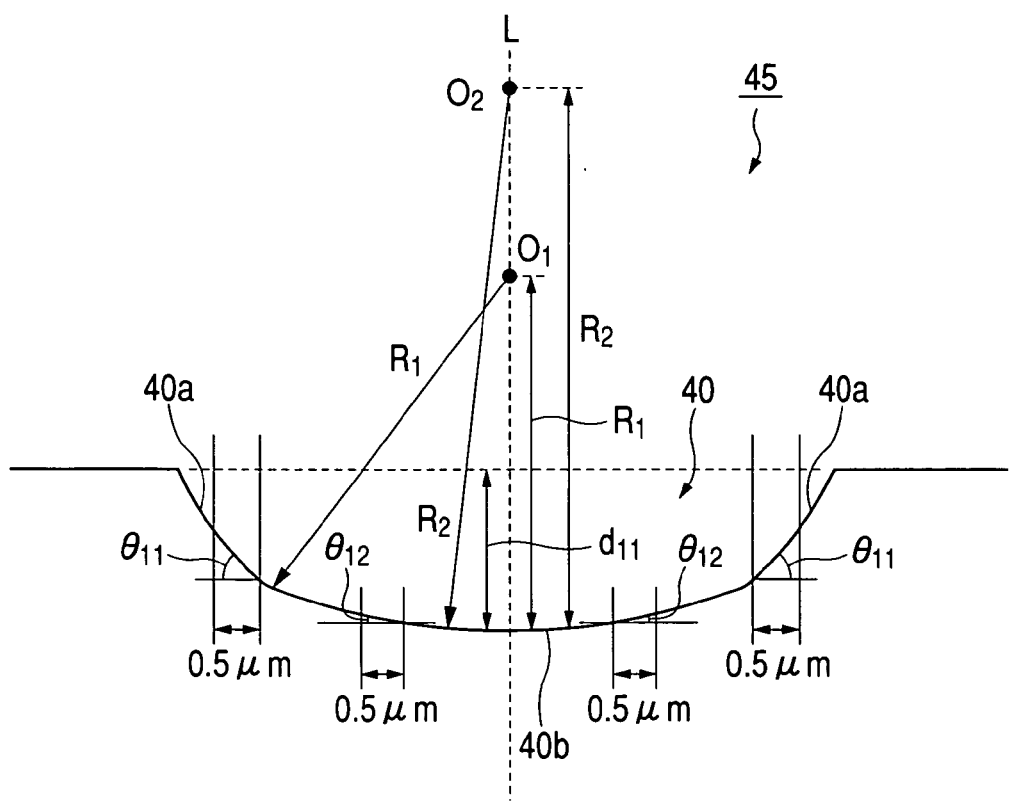
FIGS. 11A and 11B illustrate a concave portion according to a second example of the diffusive reflector included in the backlight unit according to the present invention.
Figure 11B:
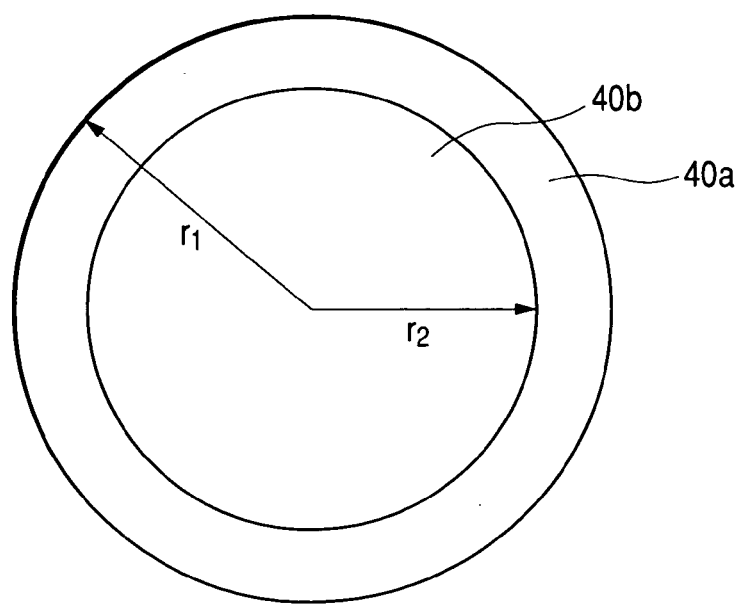

FIG. 11 illustrates one of a plurality of concave portions 40 that constitute the minute concavo-convex portion formed in a diffusive reflector 45 according to the second example. FIG. 11A is a sectional view of the concave portion 40. FIG. 11B is a plan view thereof.

As illustrated in FIG. 11, parts of a plurality of spherical surfaces having different radiuses are connected to each other, thereby forming the inside of the concave portion 40.

To be specific, an edge curved surface 40a and a shallow curved surface 40b surrounded by the edge curved surface 40a, which are parts of two spheres having different radiuses, are connected to each other, thereby forming the inside of the concave portion 40. The edge curved surface 40a is parts of the sphere, whose center is $O_1$ and whose radius is $R_1$. Furthermore, the shallow curved surface 40b is a part of the sphere, whose center is $O_2$ and whose radius is $R_2$. The normal lines set on the surface of the base of the diffusive reflector 45 from the centers $O_1$ and $O_2$ of the spheres, that is, the normal lines perpendicular to the surfaces, where the concave portions 40 are not formed in the reflector sheet, are positioned on the same straight line L.

The relationship $R_1 \leq R_2$ is established between the radiuses $R_1$ and $R_2$, which changes in the range of 10 µm$\leq R_1 \leq$70 µm and 20 µm$\leq R_2 \leq$100 µm. In FIG. 11A, $\theta_{11}$ is the tilt angle of the edge curved surface 40a and changes in the range of $10° \leq \theta_{11} \leq 35°$ and $-35° \leq \theta_{11} \leq -10°$. Furthermore, $\theta_{12}$ is the tilt angle of the shallow curved surface 40b and changes in the range of $4° \leq \theta_{12} \leq 17°$ and $-17° \leq \theta_{12} \leq -4°$.

In addition, the radius $r_1$ of the edge curved surface 40a of the concave portion 40 and the radius r2 of the shallow curved surface 40b of the concave portion 40 are determined according to the radiuses $R_1$ and $R_2$ and the tilt angles $\theta_{11}$ and $\theta_{12}$ in the plan view of the surface of the diffusive reflector 45.

Furthermore, the depth $d_{11}$ and the pitch between the concave portions 40 are randomly determined in the range of 0.1 µm to 3 µm and in the range of 5 µm to 100 µm, respectively, on the grounds mentioned in the first embodiment.

Figure 12:
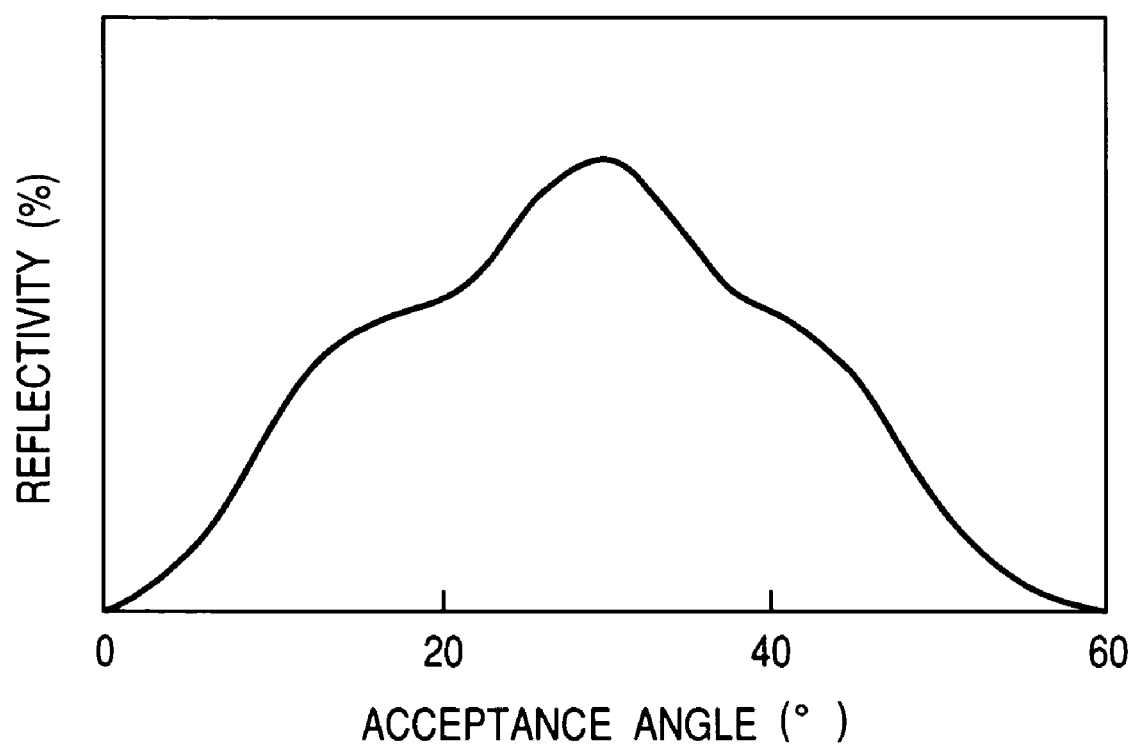
FIG. 12 is a graph illustrating an example of the reflection property of the diffusive reflector including the concave portion illustrated in FIG. 11.

FIG. 12 illustrates a relationship between the acceptance angle (unit: °) and the brightness (the reflectivity, unit: %) when light is radiated at an incidence angle 30° into the surface of the reflector sheet (reflection surface) of the diffusive reflector 45, where the plurality of concave portions 40 is formed, and the acceptance angle is changed from the perpendicular line position (0°: the normal line direction) to 60° on the basis of the specular reflection direction 30° with respect to the reflection surface.

As illustrated in FIG. 12, according the diffusive reflector 45 where the plurality of concave portions 40 is formed, the edge curved surface 40a constituting parts of the sphere, which have a small radius, exists inside the concave portion 40 formed on the reflection surface, thereby providing tilt angles having relatively large absolute values. Therefore, excellent reflectivity is obtained in the wide range of 15° to 45°. Furthermore, since the shallow curved surface 40b constituting a part of the sphere, which has a large radius, is close to a plane, the presence thereof increases the ratio of the inside that provides the tilt angle close to 0°. As a result, reflectivity increases around the peak reflectivity at the reflection angle 30° in the specular reflection direction of the incidence angle 30°.

According to the backlight including the diffusive reflector 45 where the plurality of concave portions 40 having the above-mentioned structure is formed, since the reflector sheet, which is the reflection surface of the diffusive reflector 45, is shaped as mentioned above, it is possible to effectively reflect and diffuse the light emitted from the prism surface 12c of the light guide plate 12. In particular, since the light reflected from the diffusive reflector 45 has directivity where the reflectivity in the specular reflection direction increases, the emission angle of the light emitted from the emission surface 12b of the light guide plate 12 via the diffusive reflector 45 increases. Also, it is possible to increase the emission efficiency at a specific emission angle.

Furthermore, according to the backlight including the diffusive reflector 45 having the above structure, the directivity, where the reflectivity in the specular reflection direction increases, is obtained in the diffusive reflector 45. Therefore, it is possible to control to increase the brightness of a liquid crystal display surface in a specific viewing angle range.

Moreover, since the reflection surface of the diffusive reflector 45 is shaped as mentioned above, it is possible to prevent undesirable reflection from the reflection surface. The range of the reflection angle in the diffusive reflector 45 is wide, thereby generating the directivity. As a result, it is possible to realize a liquid crystal display device with a wide viewing angle and a brighter display screen at a specific viewing angle.

(Third Example of Diffusive Reflector)

A third example of the diffusive reflector included in the backlight according to any one of the above embodiments will now be described.

The diffusive reflector according to the third example is very different from the diffusive reflector 15 (the diffusive reflector according to the first example) according to the first embodiment in the shape of the inside of the concave portion of the minute concavo-convex portion formed in the diffusive reflector.

Figure 13A:
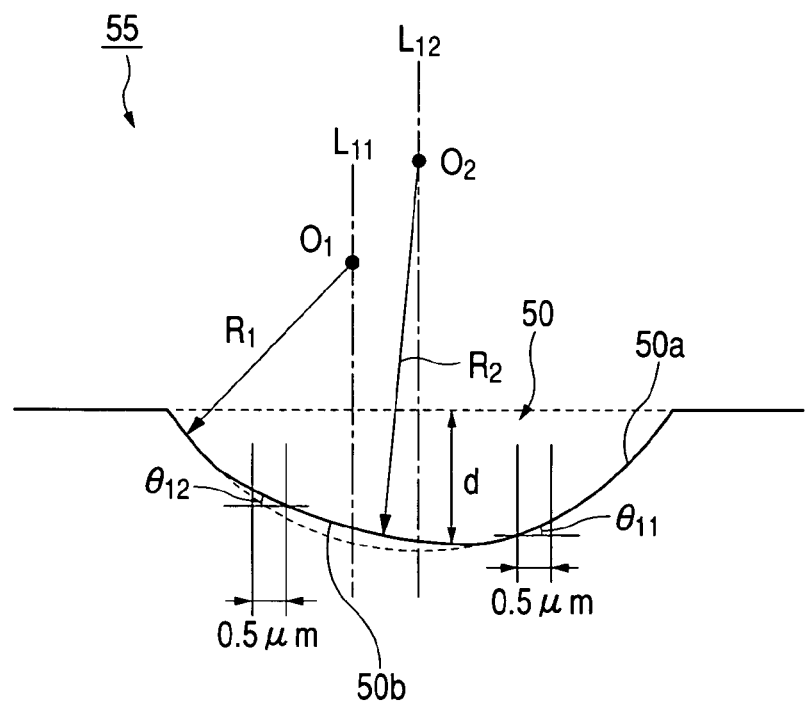
FIGS. 13A and 13B illustrate a concave portion according to a third example of the diffusive reflector included in the backlight unit according to the present invention.
Figure 13B:
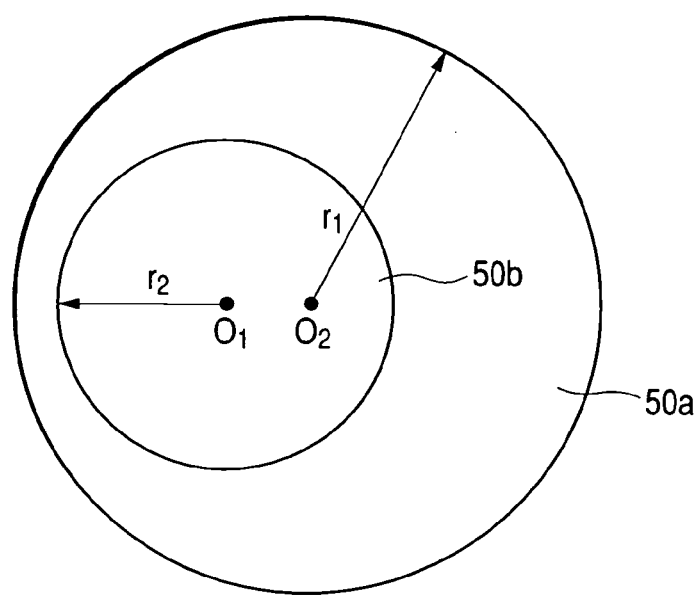

FIG. 13 illustrates one of a plurality of concave portions 50 constituting the minute concavo-convex portions formed in the diffusive reflector 55 according to the third example. FIG. 13A is a sectional view of the concave portion 50. FIG. 13B is a plan view thereof.

As illustrated in FIG. 13, an edge curved surface 50a and a shallow curved surface 50b surrounded by the edge curved surface 50a, which are parts of two spheres having different radiuses, are connected to each other, thereby forming the inside of the concave portion 50. The edge curved surface 50a is parts of the sphere, whose center is $O_1$ and whose radius is $R_1$. Furthermore, the shallow curved surface 50b is a part of the sphere, whose center is $O_2$ and whose radius is $R_2$. The normal lines, which are set on the surface of the base of the diffusive reflector 55 from the centers $O_1$ and $O_2$ of the spheres, are positioned on the straight lines $L_{11}$ and $L_{12}$, respectively.

The relationship $R_1 < R_2$ is established between the radiuses $R_1$ and $R_2$, which changes in the range of 10 µm$\leq R_1 \leq$70 µm and 20 µm$\leq R_2 \leq$100 pm. In addition, in FIG. 13A, $\theta_{11}$ is the tilt angle of the edge curved surface 50a and changes in the range of $10° \leq \theta_{11} \leq 35°$ and $-35° \leq \theta_{11} \leq -10°$. Furthermore, $\theta_{12}$ is the tilt angle of the shallow curved surface 50b and changes in the range of $4° \leq \theta_{12} \leq 17°$ and $-17° \leq \theta_{12} \leq -4°$.

The radius $r_1$ of the edge curved surface 50a of the concave portion 50 and the radius $r_2$ of the shallow curved surface 50b of the concave portion 50 are determined according to the radiuses $R_1$ and $R_2$ and the tilt angles $\theta_{11}$ and $\theta_{12}$ in the plan view of the surface of the diffusive reflector 55.

The depth d of the concave portions and the pitch between the concave portions 50 are randomly set in the range of 0.1 µm to 3 µm and in the range of 5 µm to 100 µm, respectively, on the grounds mentioned in the first embodiment.

Figure 14:
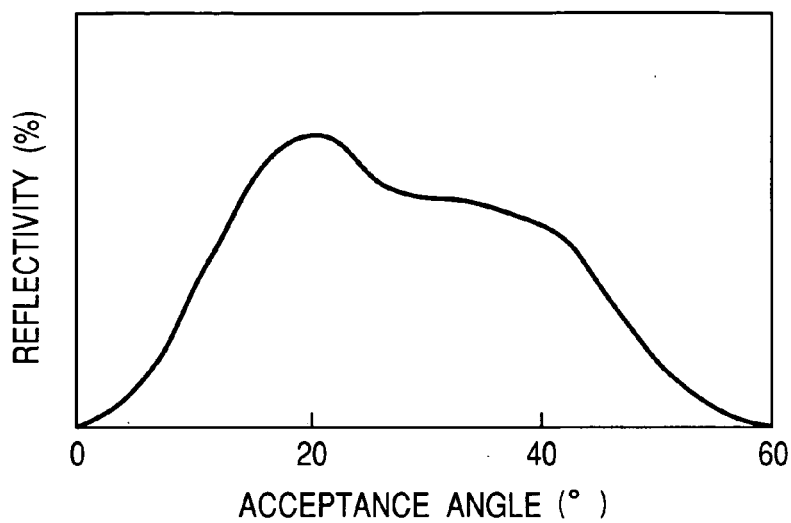
FIG. 14 is a graph illustrating an example of the reflection property of the diffusive reflector including the concave portion illustrated in FIG. 13.

FIG. 14 illustrates a relationship between the acceptance angle (unit: °) and the brightness (the reflectivity, unit: %) when light is radiated at an incidence angle 30° (light is incident from the right side in FIG. 13) into the reflection surface of the diffusive reflector 55, where the plurality of concave portions 50 is formed, and the acceptance angle is changed from the perpendicular line position (0°: the normal line direction) to 60° on the basis of the specular reflection direction 30° with respect to the reflection surface.

As illustrated in FIG. 14, according the diffusive reflector 55 of the third example, the edge curved surface 50a constituting parts of the sphere having a small radius exists inside the concave portion 50 formed on the reflection surface, thereby providing tilt angle having relatively large absolute value. Therefore, excellent reflectivity is obtained in the wide range of 15° to 45°. Furthermore, the shallow curved surface 50b constituting a part of the sphere having a large radius is close to a plane. The presence thereof increases the ratio of the inside that provides the tilt angle in a specific range. As a result, the reflectivity at a reflection angle smaller than the reflection angle 30° that is the specular reflection direction of the incidence angle 30° is at a peak. Reflectivity around the peak reflectivity increases. Therefore, in the case, the traveling direction of the light reflected from the reflection surface of the diffusive reflector 55 is shifted more to the normal line direction (the acceptance angle 0°) than to the specular reflection direction.

To the contrary, when light is incident from the left side in FIG. 13, the traveling direction of the reflected light is shifted more to the base surface than to the specular reflection direction.

According to the backlight including the diffusive reflector 55 where the plurality of concave portions 50 having the above-mentioned structure is formed, since the reflector sheet, which is the reflection surface of the diffusive reflector 55, is shaped as mentioned above, it is possible to effectively reflect and diffuse the light emitted from the prism surface 12c of the light guide plate 12. In addition, since the light reflected from the diffusive reflector 55 has directivity where the reflectivity in a specific direction increases, the emission angle of the light emitted from the emission surface of the backlight via the diffusive reflector 55 increases. Also, it is possible to increase the amount of the emission light at a specific emission angle.

Furthermore, according to the present example, since the directivity, where the reflectivity in the specific direction increases, is obtained in the diffusive reflector 55 of the backlight as mentioned above, it is possible to increase the brightness of a liquid crystal display surface in a specific viewing angle range.

(Fourth Example of Diffusive Reflector)

A fourth example of a diffusive reflector included in the backlight according to any one of the above embodiments will now be described.

The diffusive reflector according to the fourth example is very different from the diffusive reflector 15 (the diffusive reflector according to the first example) according to the first embodiment in the shape of the inside of the concave portion of the minute concavo-convex portion formed in the diffusive reflector.

Figure 15:
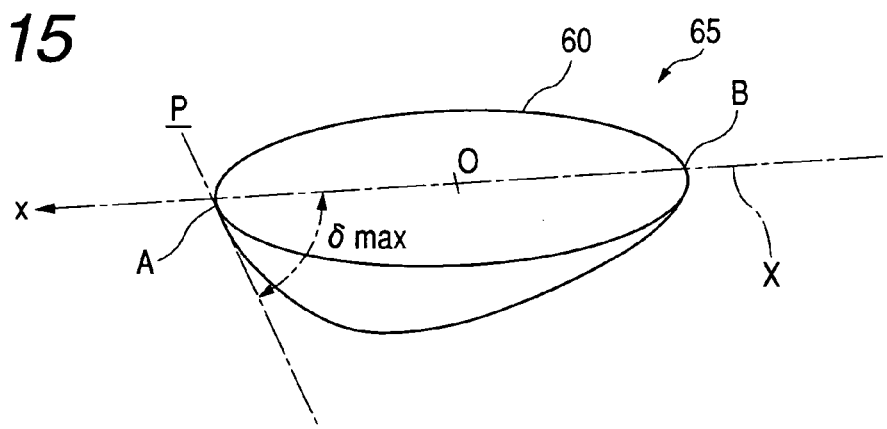
FIG. 15 is a perspective view illustrating a concave portion according to a fourth example of the diffusive reflector included in the backlight unit according to the present invention.
Figure 16:
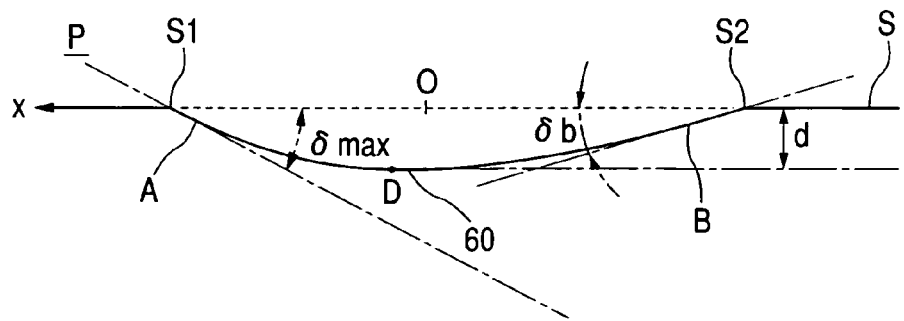
FIG. 16 is a sectional view taken along the X-axis shown in FIG. 15.

FIG. 15 is a perspective view illustrating one of a plurality of concave portions 60 that constitute the minute concavo-convex portion formed in a diffusive reflector 65 according to the fourth example. FIG. 16 is a sectional view of a specific section X that passes through the deepest point of the concave portion 60. In the specific vertical section X of the concave portion, the shape of the inside of the concave portion 60 is obtained by a first curve A from one periphery S1 of the concave portion 60 to the deepest point D and a second curve B from the deepest point of the concave portion to another periphery S2, which is connected to the first curve A. The two curves are connected to each other because the tilt angles of the two curves with respect to the base surface S at the deepest point D are 0°.

The 'tilt angle' is an angle of a tangent line with respect to a level surface (a portion in the base surface S where the concave portions are not formed) at an arbitrary portion inside the concave portion in a specific vertical section.

The tilt angle of the first curve A with respect to the base surface S is larger than the tilt angle of the second curve B. Therefore, the deepest point D deviates from the center O of the concave portion 60 in the X-direction. That is, the average of the absolute values of the tilt angles of the first curves A with respect to the base-surface S is larger than the average of the absolute values of the tilt angles of the second curves B with respect to the base surface S. In the plurality of concave portions 60 formed on the surface of the diffusive reflector, the tilt angles of the first curves A with respect to the base surface S are irregularly distributed in the range of 1° to 89°. Furthermore, in the concave portions 60, the average of the absolute values of the tilt angles of the second curves B with respect to the base surface S is irregularly distributed in the range of 0.5° to 88°.

Since the tilt angles of the two curves gently change, the maximum tilt angle δmax (the absolute value) of the first curve A is larger than the maximum tilt angle δb (the absolute value) of the second curve B. In addition, the tilt angle of the deepest point D, where the first curve A is connected to the second curve B, with respect to the base surface S is 0°. The first curve A having the negative tilt angle and the second curve B having the positive tilt angle are gently connected to each other.

The maximum tilt angles δmax of the plurality of concave portions 60 formed on the surface of the diffusive reflector 65 are irregularly distributed in the range of 2° to 90°. However, the maximum tilt angles δmax of most of the concave portions are irregularly distributed in the range of 4° to 35°.

The concave portion 60 has a single minimum point (a point on a curve where the tilt angle is 0°) D. The distance between the minimum point D and the base surface S is the depth d of the concave portion 60. The depths d of the plurality of concave portions 60 are irregularly distributed in the range of 0.1 μm to 3 μm.

According to the present embodiment, the specific section X of each of the plurality of concave portions 60 is in the same direction. In addition, each of the first curves A is aligned to a single direction. That is, all of the concave portions are formed such that the x-directions marked with the arrows in FIGS. 15 and 16 are the same.

In the diffusive reflector 65 where the plurality of concave portions 60 having the above structure is formed, the first curves A in the plurality of concave portions 60 are aligned to the same direction. Therefore, in the diffusive reflector 65, the reflected light of the light incident from the upper side of the tilt in the x-direction (on the side of the first curve A) in FIG. 16 is shifted more to the normal line direction of the base surface S than to the specular reflection direction.

To the contrary, the reflected light of the light incident from the upper side of the tilt of the direction (on the side of the second curve B) opposite to the x-direction in FIG. 16 is shifted more to the base surface S than to the specular reflection direction.

Therefore, in the overall reflection property in the specific vertical section X, the reflectivity in the direction reflected from a surface around the second curve B increases. Therefore, it is possible to obtain a reflection property where the reflection efficiency in a specific direction is selectively improved For example, in a relationship between the acceptance angle (unit: °) and brightness (the reflectivity, unit: %) when light is radiated at the incidence angle 30° from the x-direction into the reflection surface of the diffusive reflector 65, where the plurality of concave portions 60 is formed, and the acceptance angle is changed from the perpendicular line position (0°: the normal line direction) to 60° on the basis of the specular reflection direction 300 with respect to the reflection surface, like in the third embodiment, the reflectivity at a reflection angle smaller than the reflection angle 30°, which is the specular reflection direction with respect to the incidence angle 30°, is at a peak. Then, the specular reflection direction is a peak and reflectivity around the peak also increases.

According to the backlight including the diffusive reflector 65 where the plurality of concave portions 60 having the above-mentioned structure is formed, since the reflector sheet that is the reflection surface of the diffusive reflector 65 is shaped as mentioned above, it is possible to effectively reflect and diffuse the light emitted from the prism surface 12c of the light guide plate 12. Furthermore, the light reflected from the diffusive reflector 65 has directivity where the reflectivity in a specific direction increases. Therefore, it is possible to control the emission angle of the light emitted from the emission surface of the backlight via the diffusive reflector 65 and to improve the emission efficiency at a specific emission angle. Thus, it is possible to brightly display images by adjusting the emission angle in consideration of the viewing angle property of the liquid crystal display element.

(Fifth Example of Diffuse Reflector)

A fifth example of the diffusive reflector included in the backlight according to any one of the above embodiments will now be described.

The diffusive reflector according to the fifth example is very different from the diffusive reflector 15 (the diffusive reflector according to the first example) according to the first embodiment in the shape of the inside of the concave portion of the minute concavo-convex portion formed in the diffusive reflector.

Figure 17:
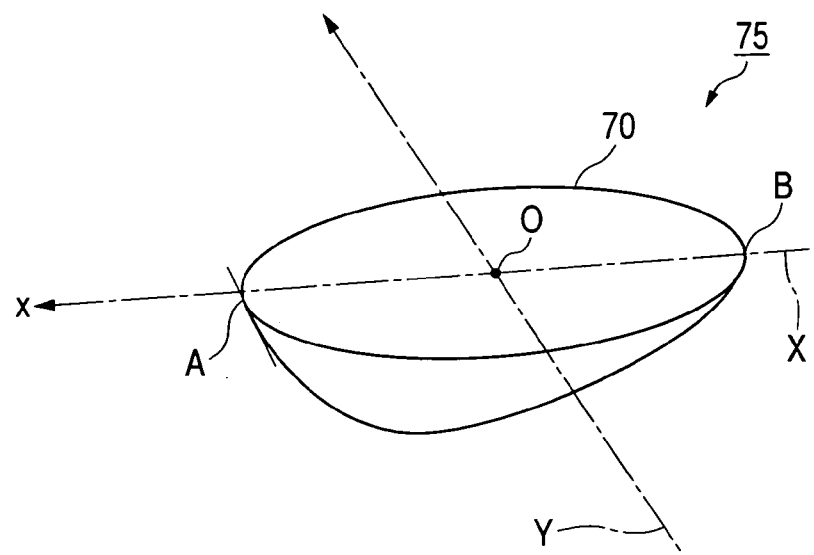
FIG. 17 is a perspective view illustrating a concave portion according to a fifth example of the diffusive reflector included in the backlight unit according to the present invention.
Figure 19:
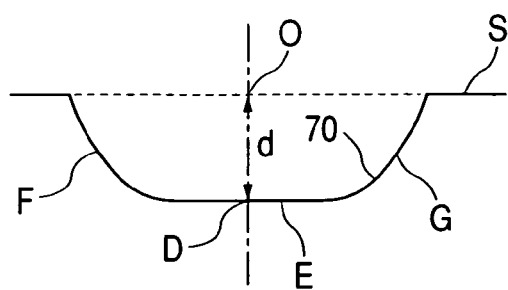
FIG. 19 is a sectional view taken along the Y-axis shown in FIG. 17.

FIGS. 17 and 19 illustrate the inside shape of one of a plurality of concave portions 70 that constitute the minute concavo-convex portion formed in a diffusive reflector 75 according to the fifth example.

Figure 18:
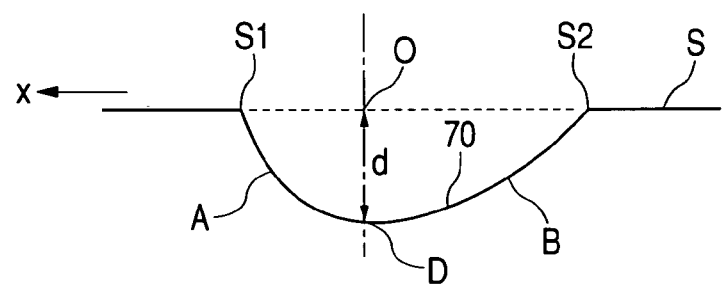
FIG. 18 is a sectional view taken along the X-axis shown in FIG. 17.

FIG. 17 is a perspective view of the concave portion 70. FIG. 18 illustrates the section (the vertical section X) taken along the X-axis of the concave portion 70. FIG. 19 illustrates the section (the vertical section Y) taken along the Y-axis perpendicular to the X-axis of the concave portion. 70.

As illustrated in FIG. 18, the inside shape in the vertical section X of the concave portion 70 is obtained by a first curve A from one periphery $S_1$ of the concave portion 70 to the deepest point D and a second curve B from the deepest point D of the concave portion to another periphery S2, which is connected to the first curve A. In FIG. 18, the backward leaning first curve A and the forward leaning second curve B are gently connected to each other because the tilt angle of the deepest point D with respect to the base surface S is 0°.

The 'tilt angle' is an angle of a tangent line with respect to a level surface (a portion of the base surface S where the concave portions are not formed) in an arbitrary portion inside the concave portion in a specific vertical section.

The tilt angle of the first curve A with respect to the base surface S is steeper than the tilt angle of the second curve B, and the deepest point D deviates from the center O of the concave portion 70 along the X-axis in the direction (the direction x) that faces the edge of the concave portion. That is, the average of the absolute values of the tilt angles of the first curves A with respect to the base surface S is larger than the average of the absolute values of the tilt angles of the second curve B with respect to the base surface S. In the plurality of concave portions 70 formed on the surface of the diffusive reflector, the average of the absolute values of the tilt angles of the first curves A with respect to the base surface S is irregularly distributed in the range of 2° to 90°. Furthermore, in the plurality of concave portions 70, the average of the absolute values of the tilt angles of the second curves B with respect to the base surface S is irregularly distributed in the range of 1° to 89°.

As illustrated in FIG. 19, the inside shape in the vertical section Y of the concave portion 70 is almost symmetrical with respect to the center O of the concave portion 70. A shallow curve E having the large radius of curvature, that is, close to a straight line is formed around the deepest point D of the concave portion 70. Deep curves F and G having the small radiuses of curvatures are formed on the left and right of the shallow curve E. The absolute values of the tilt angles of the shallow curves E in the plurality of concave portions 70 formed on the surface of the diffusive reflector 75 are almost less than 10°. In addition, the absolute values of the tilt angles of the deep curves F and G in the plurality of concave portions 70 are irregularly distributed in the range of, for example, 20 to 90°. The depths d of the deepest points D are irregularly distributed in the range of 0.1 μm to 3 μm.

According to the present example, in the plurality of concave portions 70, which are formed on the surface of the diffusive reflector 75, the sections, which provide the shapes of the vertical sections X, are in the same directions, and the sections, which provide the shapes of the vertical sections Y, are in the same directions. Furthermore, in the concave portions 70, the directions from the deepest points D to the peripheries Si through the first curves A are the same. That is, all of the concave portions 70 formed on the surface of the diffusive reflector are formed such that the x-directions marked with the arrows in FIGS. 17 and 18 are the same.

According to the present embodiment, the directions of the concave portions 70 formed on the surface of the diffusive reflector 75 are the same, and the directions from the deepest points D to the peripheries Si through the first curves A are the same. Therefore, in the diffusive reflector 75, the reflected light of the light incident from the upper side of the tilt in the x-direction (on the side of the first curve A) shown in FIGS. 17 and 18 is shifted more to the normal line of the base surface S than to the specular reflection direction.

To the contrary, the reflected light of the light incident from the upper side of the tilt in the direction (on the side of the second curve B) opposite to the x-direction shown in FIGS. 17 and 18 is shifted more to the base surface S than to the specular reflection direction.

The vertical section Y perpendicular to the vertical section X has the shallow curve E with the large radius of curvature and the deep curves F and G with the small radiuses of curvatures on both sides of the shallow curve E. Therefore, in the reflection surface of the diffusive reflector 75, the reflectivity in the specular reflection direction increases.

Figure 20:
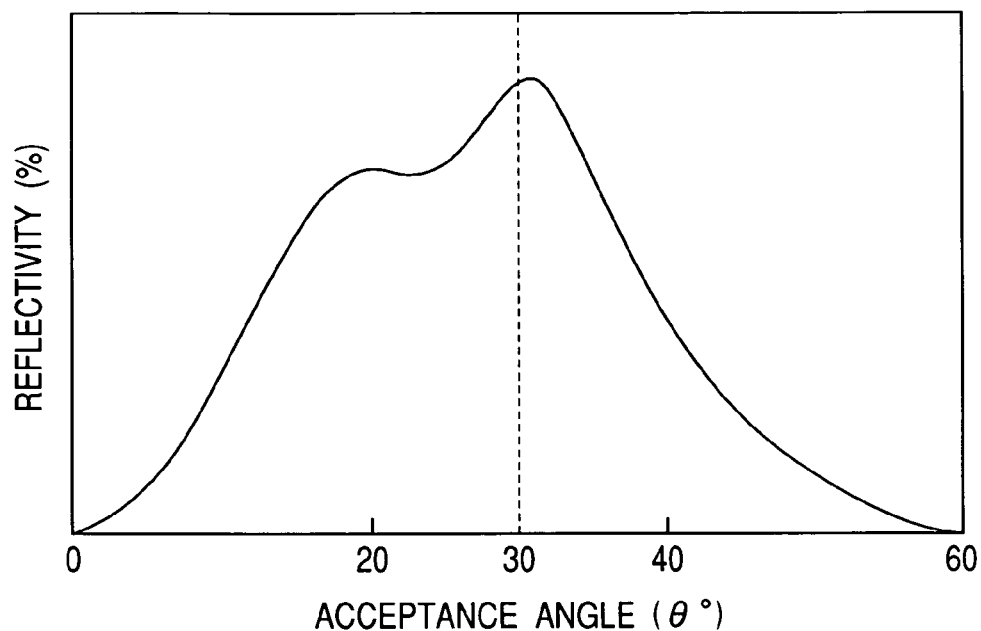
FIG. 20 is a graph illustrating an example of the reflection property of the diffusive reflector including the concave portion illustrated in FIG. 17.
Figure 21:
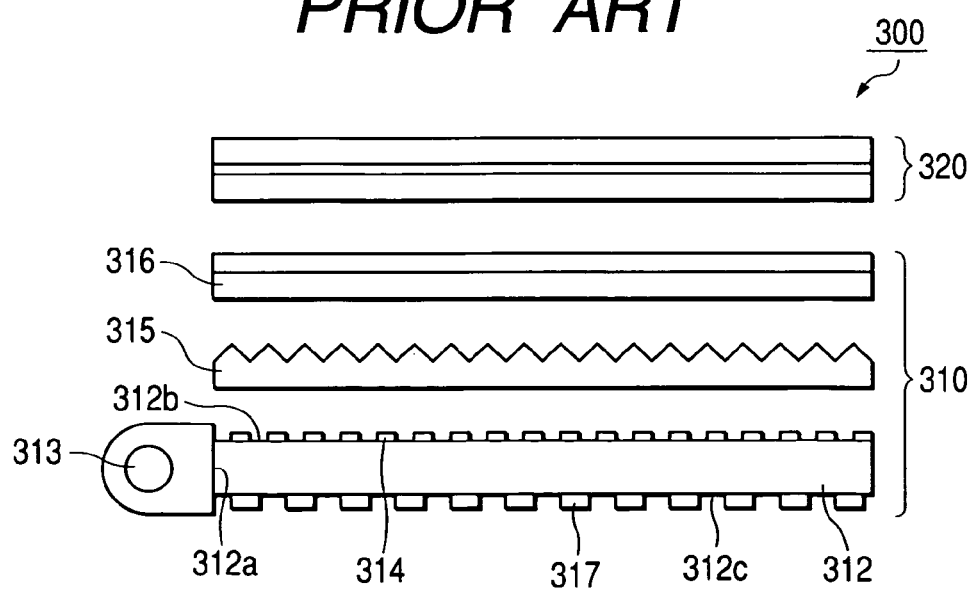
FIG. 21 is a schematic sectional view illustrating an example of the conventional passive liquid crystal display device.
Figure 22:
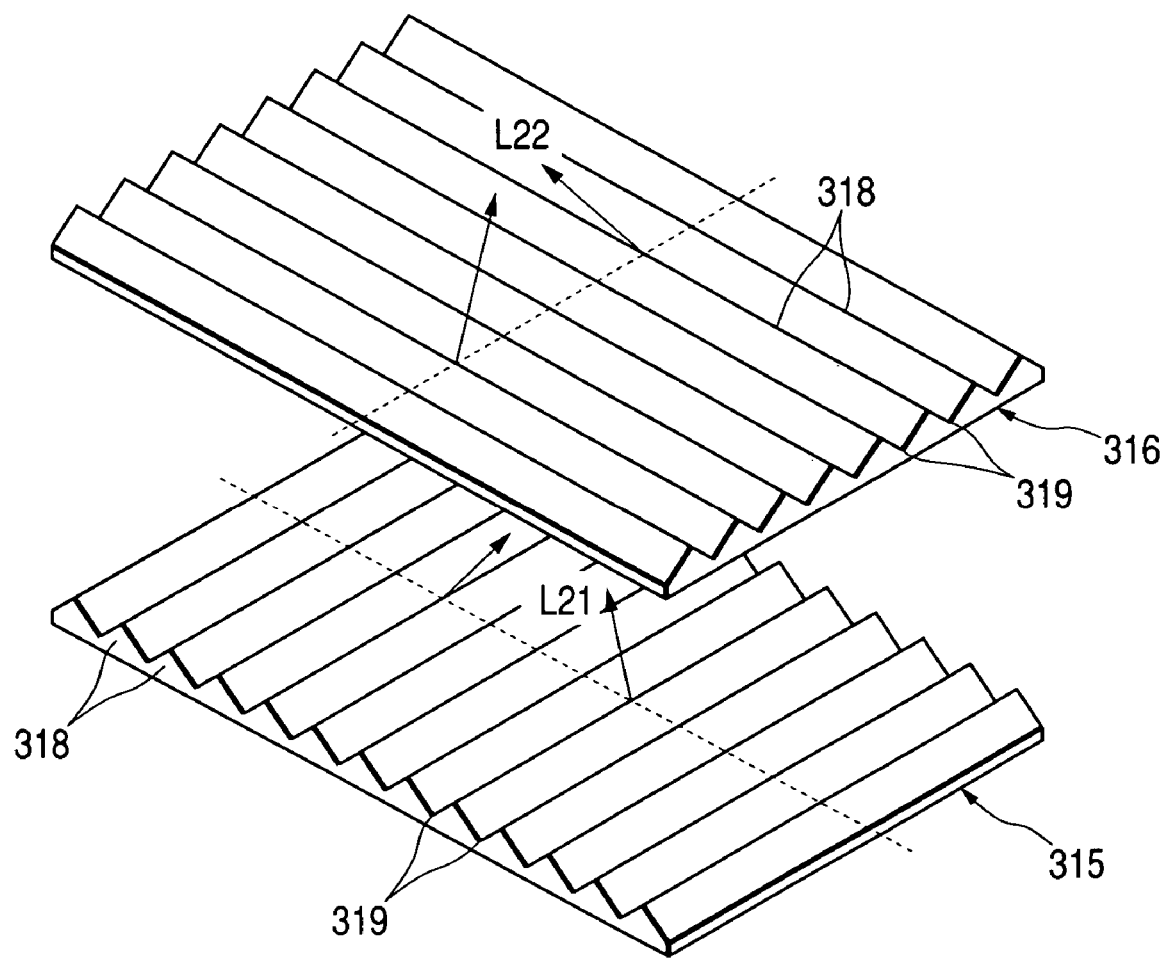
FIG. 22 is a perspective view illustrating two prism sheets included in the conventional liquid crystal display device shown in FIG. 21.

As a result, as illustrated in FIG. 20, according to the overall reflection properties in the vertical section X, it is possible to secure enough reflectivity in the specular reflection direction and to appropriately condense the reflected light to a specific direction. FIG. 20 illustrates a relationship between a viewing angle (θ°) and the brightness (the magnitude of the reflectivity) when light is radiated at the incidence angle 30° from the direction shifted more to the x-direction than to the normal line direction of the base surface S into the diffusive reflector 75, where the plurality of concave portions 70 is formed, and the viewing angle is continuously changed from the perpendicular line position (0°) to 60° on the basis of the specular reflection direction 30° with respect to the base surface S. In the reflection property illustrated by the graph, the integral value of the reflectivity in the reflection angle smaller than the specular reflection angle 30° is larger than the integral value of the reflectivity in the reflection angle larger than the specular reflection angle, and the reflection direction is shifted more to the normal line than to the specular reflection direction.

According to the backlight including the diffusive reflector 75 where the plurality of concave portions 70 having the above structure is formed, since the reflector sheet, which is the reflection surface of the diffusive reflector 75, is shaped as mentioned above, it is possible to effectively reflect and diffuse the light emitted from the prism surface 12c of the light guide plate 12. Furthermore, the light reflected from the diffusive reflector 75 has the directivity where the reflectivity in a specific direction increases. Therefore, it is possible to control the emission angle of the light emitted from the emission surface of the backlight via the diffusive reflector 75 and to improve the emission efficiency in a specific emission angle.

As mentioned above, since the directivity, where the reflectivity in the specific direction increases, is obtained in the diffusive reflector 75 of the backlight, it is possible to increase the brightness of the liquid crystal display surface in a specific viewing angle range when the reflection property is adjusted in consideration of the viewing angle property of the liquid crystal display element.

Furthermore, according to the above embodiments, any one of the concave portions according to the first to fifth examples is used for the plurality of concave portions that form the minute concavo-convex portion of the diffusive reflector included in the backlight according to the present invention. However, when any one of the concave portions according to the first to fifth examples is formed such that the concave side faces the side of the substrate 15a (the side opposite to the light guide plate 12), it is possible to use that portions as a plurality of convex portions that form the minute concavo-convex portion of the diffusive reflector included in the backlight according to the present invention.

Moreover, the scope of the present invention is not limited to the above-mentioned embodiments. Various modifications may be made without departing from the subject of the present invention.

For example, according to the above examples, the base of the diffusive reflector is composed of a substrate, an organic film, and a reflector sheet. However, the present invention is not limited thereto. For example, the diffusive reflector may be obtained by forming the base of a metal plate with high reflectivity such as an aluminum plate and by forming a plurality of concave portions of predetermined depth by chopping the entire surface using the front end (the convex portion) of a punch.

The present invention is not limited to a passive liquid crystal display device and may be applied to an active matrix liquid crystal display device.

In addition, the present invention is not limited to a transmissive liquid crystal display device and may be applied to a transflective liquid crystal display device.

As mentioned above, according to the backlight unit of the present invention, since the diffusive reflector is provided on the side opposite to the emission surface of the light guide plate, it is possible to improve the utilization efficiency of light and the uniformity of the emission light and to brightly illuminate the illuminated region.

Furthermore, according to the liquid crystal display device of the present invention, since the backlight unit according to the present invention is provided on the rear side of the liquid crystal display unit, it is possible to uniformly and brightly illuminate a liquid crystal display unit. In addition, displayed images are easily recognizable, and the quality of display is excellent. Moreover, the liquid crystal display device can be driven by low power consumption due to the improvement of the utilization efficiency of light.

What is claimed is:

1. A backlight unit, comprising:
a light source;
a light guide plate for introducing light emitted from the light source from an incidence surface provided on an end and emitting the light from an emission surface of the light guide plate;
a diffusive reflector disposed to face a second surface of the light guide plate opposite to the emission surface of the light guide plate; and
an air space disposed between the light guide plate and the diffusive reflector, wherein the diffusive reflector is provided such that a minute concave-convex portion having a light reflection property is formed on a surface of a base thereof and that the surface having the minute concave-convex portion faces the second surface opposite to the emission surface of the light guide plate,
wherein the depths of the concave portions are randomly formed in the range of 0.1 µm to 3 µm and the pitches between the adjacent concave portions are randomly set in the range of 5 µm and 100 µm, and
wherein tilt angles inside the concave portions are set in the range of −18° to +18°.

2. The backlight unit according to claim 1,
wherein a light directivity control sheet, in which a plurality of pyramid-shaped objects is formed on a base, is provided on the first surface of the light guide plate such that apexes of the pyramid-shaped objects face an opposite side to the light guide plate, and
wherein the light directivity control sheet controls directivity of transmissive light components of at least two other directions of the light components that are emitted from the first surface of the light guide plate and pass through the light directivity control sheet.

3. The backlight unit according to claim 2,
wherein a light diffusive sheet is provided on a surface of the light directivity control sheet where a plurality of pyramid-shaped objects is formed.

4. The backlight unit according to claim 2,
wherein a minute concave-convex portion having light diffusion property is formed on a surface of the light directivity control sheet opposite to the light guide plate.

5. The backlight unit according to claim 1,
wherein a thickness of a side far from the light source in the light guide plate is smaller than a thickness of a side close to the light source.

6. The backlight unit according to claim 1,
wherein the light source comprises an intermediate light guide object provided along the end of the light guide plate and a point light source provided along a longitudinal end of the intermediate light guide object.

7. A liquid crystal display device comprising the backlight unit according to claim 1 and a liquid crystal display unit illuminated by the backlight unit from a rear side.

8. A backlight unit, comprising:
a light source;
a light guide plate emitting light from the light source from an emission surface of the light guide plate;
a diffusive reflector disposed to face a second surface of the light guide plate opposite to the emission surface, the diffusive reflector comprising a plurality of light diffusing concave convex portions, the depths of the concave portions are randomly formed in the range of 0.1 µm to 3 µm and the pitches between the adjacent concave portions are randomly set in the range of 5 µm and 100 µm, and tilt angles inside the concave portions are set in the range of −18° to +18°; and
an air space layer disposed between the light guide plate and the diffusive reflector.

9. The backlight unit according to claim 8, further comprising an air space or adhesion layer disposed between the light guide plate and the diffusive reflector.

10. The backlight unit of claim 8, further comprising a light directivity control sheet comprising a plurality of pyramid-shaped objects disposed on a base thereof, the plurality of pyramid-shaped objects facing away from the light guide plate; and
wherein the light directivity control sheet controls directivity of transmissive light components of at least two other directions of the light components that are emitted from the emission surface of the light guide plate and that pass through the light directivity control sheet.

11. The backlight unit according to claim 10, wherein the plurality of pyramid-shaped objects comprise discontinuously spaced apex portions directed away from the light guide plate.

12. The backlight unit according to claim 10, wherein the pyramid shaped objects are shaped in the form of a member selected from the group consisting of quadrangular pyramid, hexangular pyramid, octangular pyramid, cone and elliptic cone.

13. The backlight unit according to claim 10, further comprising a light diffusive sheet disposed over the light directivity control sheet.

14. The backlight unit according to claim 13, wherein the light diffusive sheet comprises concave-convex portions diffusing light emitted from the emission surface of the light guide plate.

15. The backlight unit according to claim 10, wherein the light diffusing concave-convex portions are disposed on a surface of the light directivity control sheet facing the light guide plate.

16. The backlight unit according to claim 8, further comprising a first prism sheet and a second prism sheet disposed over the emission surface of the light guide plate, wherein a cross section of each prism sheet comprises triangular shaped protrusions separated by wedge shaped grooves.

17. The backlight unit according to claim 16, wherein the first prism sheet and the second prism sheet are arranged so that edge lines corresponding to the triangular shaped protrusions in a first prism sheet are perpendicular to edge lines corresponding to the triangular shaped protrusions in a second prism sheet.

18. The backlight unit according to claim 8,
wherein a thickness of the light guide plate decreases with increasing distance from the light source.

19. The backlight unit according to claim 8,
wherein the light source comprises an intermediate light guide object provided along the end of the light guide plate and a point light source provided along a longitudinal end of the intermediate light guide object.

20. A liquid crystal display device comprising the backlight unit according to claim 8, wherein the liquid crystal display unit is illuminated by the backlight unit from a rear side.

* * * * *